United States Patent [19]
Sakai et al.

[11] Patent Number: 5,621,541
[45] Date of Patent: Apr. 15, 1997

[54] IMAGE PROCESSING APPARATUS FOR DISCRIMINATING THE INPUT DEVICE AND SELECTING RECORDING SHEETS BASED THEREON

[75] Inventors: Masanori Sakai, Yokohama; Kunio Yoshihara, Sagamihara; Yoshinobu Aiba, Yokohama; Hiroshi Ohmura, Inagi; Hideto Kohtani, Yokohama; Eiji Sakaguchi, Kawasaki; Takehito Utsunomiya, Yokohama; Makoto Kikugawa, Tokyo, all of Japan

[73] Assignee: Canon Kabushiki Kaisha, Tokyo, Japan

[21] Appl. No.: 567,803

[22] Filed: Dec. 6, 1995

Related U.S. Application Data

[63] Continuation of Ser. No. 450,100, May 25, 1995, abandoned, which is a continuation of Ser. No. 974,854, Nov. 10, 1992, abandoned.

[30] Foreign Application Priority Data

Nov. 11, 1991 [JP] Japan .................... 3-322573

[51] Int. Cl.$^6$ .................... H04N 1/00; H04N 1/40; H04N 1/04
[52] U.S. Cl. .................... 358/407; 358/401; 358/448; 358/498; 399/107; 399/391
[58] Field of Search .................... 358/401, 403, 358/404, 444, 448, 449, 450, 451, 496, 498, 407; 355/308, 309, 321, 323, 202, 311; 382/297, 296, 298; H04N 1/00, 1/40, 1/387, 1/393, 1/04; G03G 21/00; G06K 9/32

[56] References Cited

U.S. PATENT DOCUMENTS

| | | | |
|---|---|---|---|
| 4,860,110 | 8/1989 | Kokubu | 358/400 |
| 4,910,607 | 5/1990 | Kita et al. | 358/448 |
| 5,019,916 | 5/1991 | Ogura | 358/449 |
| 5,034,733 | 7/1991 | Okazawa et al. | 382/46 |
| 5,038,218 | 8/1991 | Matsumoto | 358/448 |
| 5,051,843 | 9/1991 | Hayashi | 358/448 |
| 5,068,904 | 11/1991 | Yamazaki | 382/46 |
| 5,105,230 | 4/1992 | Emori | 355/319 |
| 5,105,231 | 4/1992 | Watanabe et al. | 355/323 |
| 5,117,266 | 5/1992 | Takemura et al. | 355/308 |
| 5,217,217 | 6/1993 | Matsumoto | 355/308 |

FOREIGN PATENT DOCUMENTS

| | | |
|---|---|---|
| 0291077 | 11/1988 | European Pat. Off. . |
| 0391632 | 10/1990 | European Pat. Off. . |
| 4027659 | 3/1991 | Germany . |
| 2217261 | 10/1989 | United Kingdom . |
| 2220815 | 1/1990 | United Kingdom . |

OTHER PUBLICATIONS

"Xerox Copier User Guide" ©May 1990 by Xerox Corporation.

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An image forming apparatus having functions of a scanner, a printer, and a facsimile includes a rectangular recording sheet, a first sheet cassette to enclose the recording sheet in a first direction, a second sheet cassette to enclose the recording sheet in a second direction different from the first direction by 90°, an input unit to input first and second image data in the first direction, a rotating unit to rotate the second image data from the input unit in the second direction, an image forming unit to form an image based on the first image data from the input unit or the second image data from the rotating unit onto the recording sheet fed from the first or second sheet cassette, and a feeder for feeding the recording sheet in the first sheet cassette to the image forming unit when the input unit inputs the first image data and for feeding the recording sheet in the second sheet cassette to the image forming unit when the input unit inputs the second image data.

23 Claims, 21 Drawing Sheets

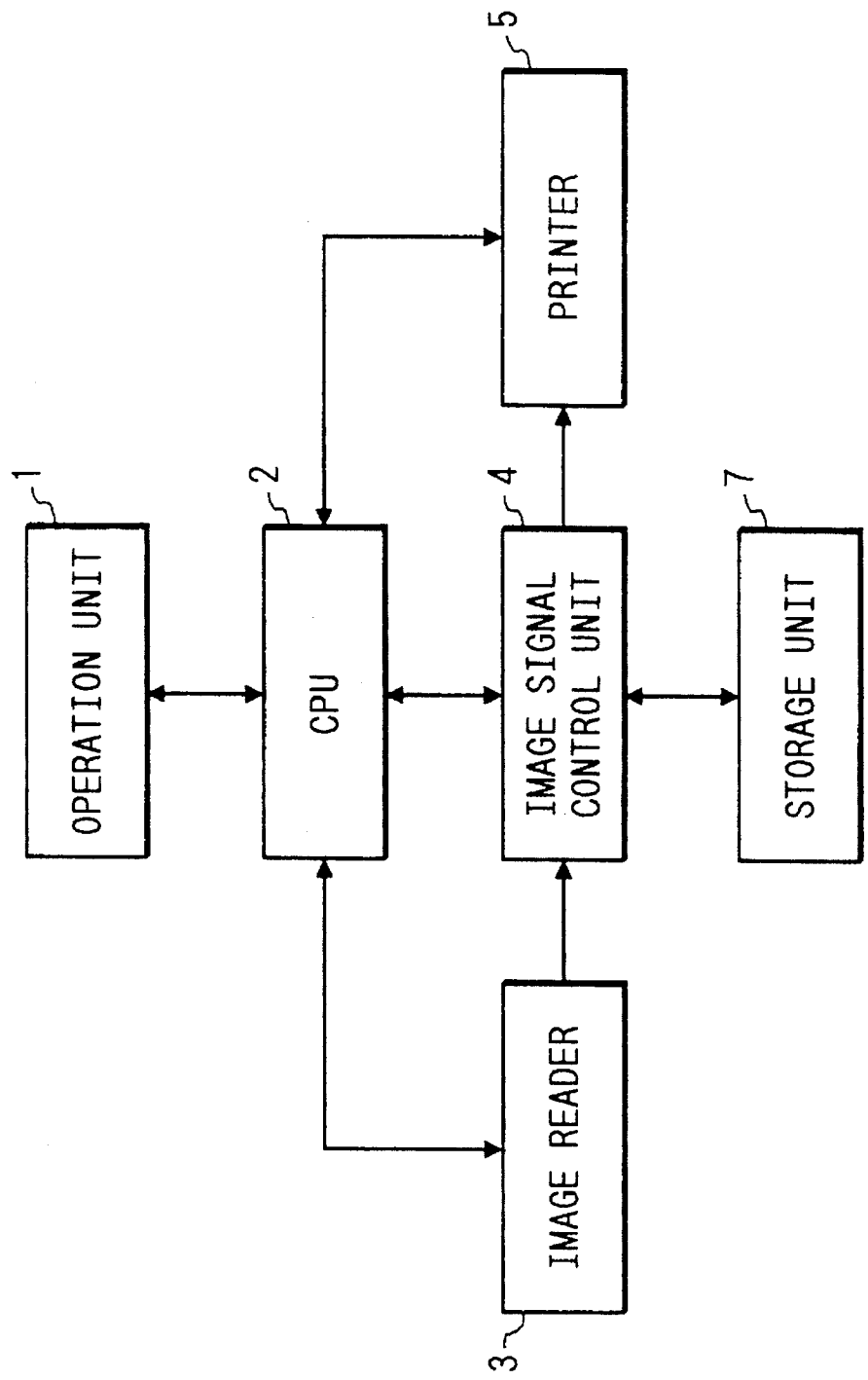

IMAGE PROCESSING APPARATUS FOR DISCRIMINATING THE INPUT DEVICE AND SELECTING RECORDING SHEETS BASED THEREON

This application is a continuation of application Ser. No. 08/450,100 filed May 25, 1995, now abandoned, which was a continuation of application Ser. No. 07/974,854 filed Nov. 10, 1992, now abandoned.

BACKGROUND OF THE INVENTION

1. Field of the Invention

The invention relates to an image processing apparatus for processing input image data and for outputting the processed image data.

2. Related Background Art

Hitherto, in an image processing system having functions of a scanner, a printer, and a facsimile, in case of executing the copy of an original and the facsimile transmission, either one of the following two methods is used. That is there is a method whereby by first reading the original from the scanner and outputting by the printer, the original image is copied and, after that, the original is again read out from the scanner and transmitted by the facsimile. There is another method whereby, on the contrary, the original is read out from the scanner and facsimile transmitted and, after that, the original is again read out from the scanner and printed by the printer.

Therefore, hitherto, there is a problem such that the original must be read out twice for both of the copy and the facsimile transmission and the original is damaged. There is also a problem such that the conventional method is disadvantages from a viewpoint of time.

On the other hand, when a copy interruption occurs during the facsimile reception and recording or the like, a facsimile recorded paper and a copied paper mixedly exist on a discharge tray. Thus, there is a fear such that the user erroneously brings the copied paper together with the facsimile recorded paper.

In the conventional copying machine, by setting a registration number for one original by a key operation, a plurality of sheets of copy papers can be obtained by one operation. On the other hand, even in a printer which is connected to a computer or the like, a plurality of outputs can be obtained by a single operation by setting a registration number. For instance, in case of obtaining N sheets of copy papers, there is also a copying machine having a function such that either one of the serial numbers 1 to N is written to each copy paper and the copy papers with the serial numbers are discharged.

In such a conventional apparatus, however, in the case where the operator wants to insert different characters or a picture (distribution destination side, user destination side, or the like) other than the serial number to each of a plurality of output papers, a work such that those characters or picture is written to the discharged image or a paper on which such characters or picture has been written by the hand is separately prepared and adhered onto the discharged copy paper or the like is necessary. There is, consequently, a problem such that it is troublesome and it takes a long time to perform such a work.

SUMMARY OF THE INVENTION

It is an object of the present to provide an image processing apparatus which can solve the above problems.

Another object of the invention is to provide an image processing apparatus which can use a plurality of functions in parallel.

Still another object of the invention is to provide an image processing apparatus which can reduce the number of reading times of an original.

Further another object of the invention is to provide an image processing apparatus which can easily sort the recorded sheets by using a plurality of functions.

Further another object of the invention is to provide an image processing apparatus which can easily perform an image edition.

BRIEF DESCRIPTION OF THE DRAWINGS

FIG. 21 is a block diagram showing the seventh embodiment of the invention;

DETAILED DESCRIPTION OF THE PREFERRED EMBODIMENTS

Figure 1:
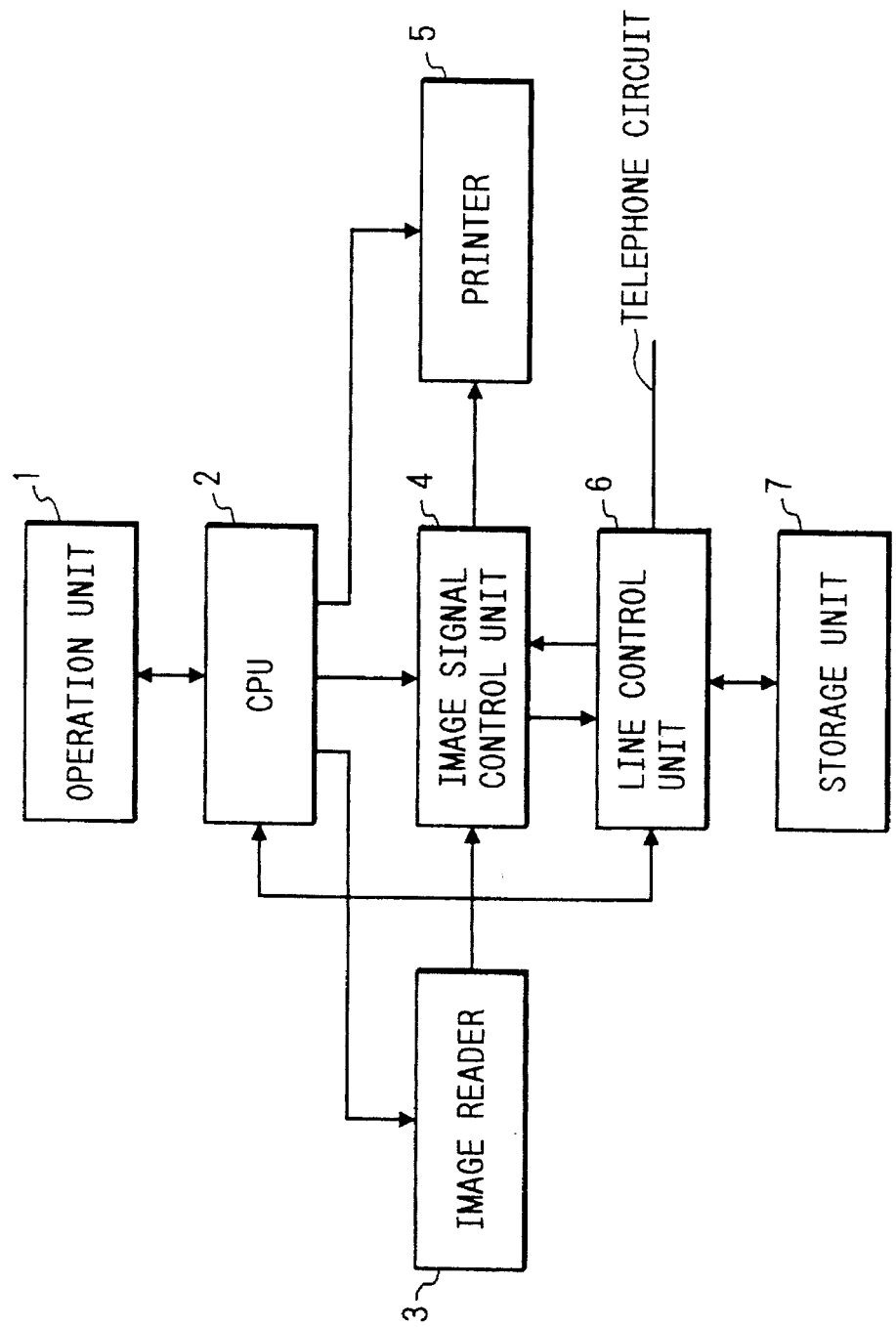
FIG. 1 is a block diagram showing the first embodiment of the invention.

FIG. 1 is a block diagram showing the first embodiment of the invention.

The image processing system comprises: an operation unit 1 to set various kinds of operations in the system; an image reader 3 to read an original; an image signal control unit 4 to process image information from the image reader 3; a printer 5 for receiving the processed image information from the image signal control unit 4 and for outputting the received information as a visible image; a line control unit 6 for receiving the image signals from the operation unit 1, image reader 3, and image signal control unit 4 mentioned above and for transmitting the received image onto a telephone circuit; a storage unit 7 for storing the image information sent to the line control unit 6; and a CPU 2 to control the printer 5 and the like.

Figure 2:
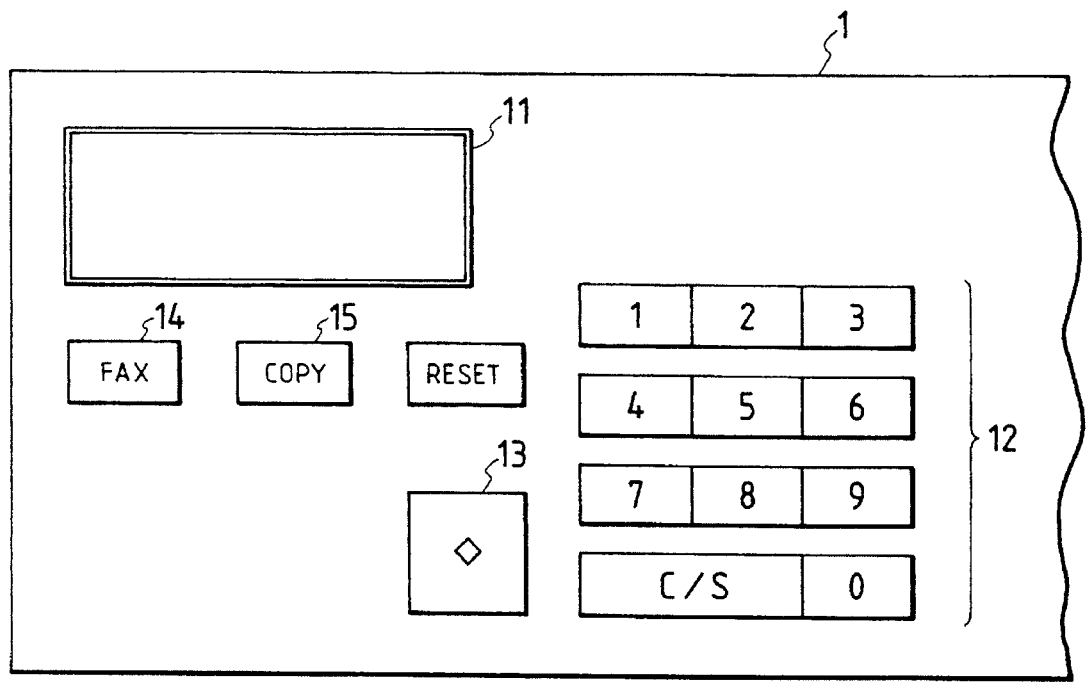
FIG. 2 is a plan view showing an operation unit in the first embodiment.

FIG. 2 is a plan view showing an external view of the operation unit 1.

The operation unit 1 comprises: an LCD panel 11 to output a message for the operation; a ten-key 12 to input the number of copy sheets of an original or the telephone number of a transmission partner in the facsimile transmission mode; a start button 13 to instruct the start of either one of or both of the copy and the facsimile transmission or the like; a facsimile instruction button 14 to instruct to the image processing system of the embodiment in the facsimile transmission mode; and a copy instruction button 15 to instruct to the image processing system of the embodiment when the original is copied.

An operating method when the facsimile transmission is executed while copying in the construction as mentioned above will now be described.

Figure 3:
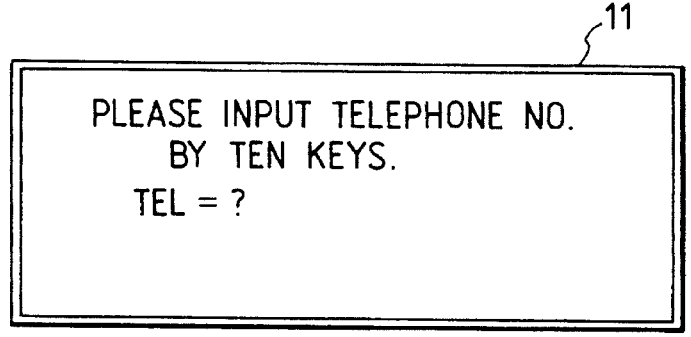
FIG. 3 is a plan view showing a guide display in the operation unit in the first embodiment.

First, when the facsimile instruction button 14 in the operation unit 1 is depressed, a message to input the telephone number on the transmission destination side is displayed on the LCD panel 11. FIG. 3 is a diagram showing such a display state. Therefore, the telephone number of the transmission partner is designated by using the ten-key 12.

Figure 4:
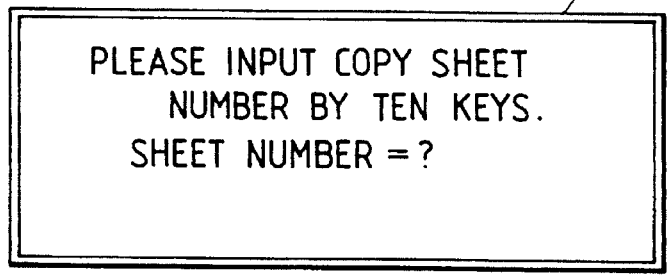
FIG. 4 ms a plan view showing a guide display in the operation unit in the first embodiment.

When the copy instruction button 15 is now depressed, a message to input the copy sheet number is displayed. FIG. 4 is a diagram showing such a display state. Therefore, a desired copy sheet number is designated by using the ten-key 12.

After the telephone number of the partner of the facsimile and the copy sheet number were inputted by the ten-key 12, by depressing the start button 13, the operation to facsimile-transmit while performing the copying operation is started.

Figure 5:
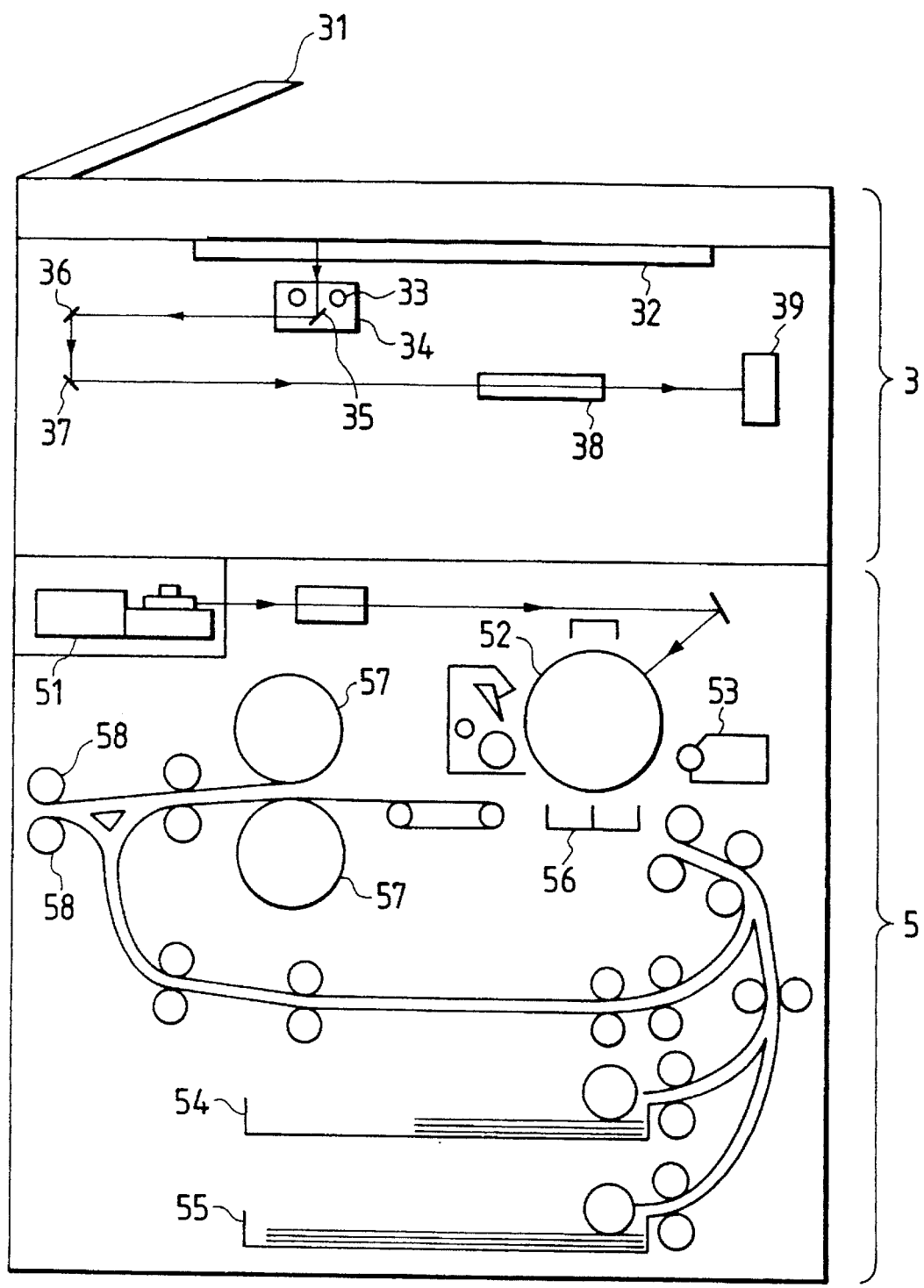
FIG. 5 is a cross sectional view showing a structure of the first embodiment.

FIG. 5 is a cross sectional view showing a structure of the image reader 3 and printer 5 mentioned above.

The image reader 3 will be first explained. In FIG. 5, originals put on a document feeder 31 are sequentially conveyed one by one onto an original supporting glass 32 from the last page. When the originals are conveyed, a lamp of a scanner section 33 is lit on and a scanner unit 34 moves and illuminates the original.

The reflected light from the original is reflected by mirrors 35, 36, and 37 and passes through a lens 38. After that, the reflected light enters an image sensor unit 39. An image signal supplied to the image sensor unit 39, namely, an output signal from the image reader 3 is processed by the image signal control unit 4 which is controlled by the CPU 2. After that, the processed signal is supplied to the printer 5 and line control unit 6.

The printer 5 will now be described. The signal supplied to the printer 5 is converted into the photo signal by an exposure control unit 51 and illuminates a photo sensitive material 52 in accordance with the image signal. A latent image formed on the photo sensitive material 52 by the illumination light is developed by a developing unit 53.

A copy transfer paper is conveyed by a copy transfer paper stacking unit 54 or 55 at a timing matched with the timing of the latent image. The developed image is transferred to the copy transfer paper by a copy transfer unit 56. The transferred image is fixed onto the copy transfer paper by a fixing unit 57 and, after that, the paper is discharged to the outside of the apparatus by a discharge unit 58.

In accordance with the copy sheet number set by the operation unit 1, the CPU 2 reads out the image information from the image reader 3 and processes by the image signal control unit 4. After that, the processed image signal is sent to the printer 5 and a desired number of copy sheets are copied.

In this instance, the CPU 2 controls in a manner such that the transmission of the image information from the image signal control unit 4 to the line control unit 6 is executed only once. That is, when the copy sheet number is set to, e.g., three by the operation unit 1, the CPU 2 first conveys the last page on the document feeder 31 onto the original supporting glass 32. In association with the movement of the scanner unit 34, the image information is outputted from the image reader 3.

Since the copy sheet number has been set to 3, the image signal control unit 4 processes the image information supplied from the image reader 3 in the first scan and sends to the printer 5 and the line control unit 6.

In the second or third scan, the image signal control unit 4 supplies the image information to only the printer 5 but does not, supply to the line control unit 6. On the other hand, the second and third scans are not executed but the image information stored in the line control unit 6 is read out in the first scan and supplied to the printer 5, so that the third copy sheet can be also completed.

The original before the last page on the document feeder 31 is subsequently conveyed onto the original supporting glass 32 and the operations similar to those of the last page mentioned above are executed. The above operations are executed for all of the originals put on the document feeder 31.

The line control unit 6 and the storage unit 7 will now be described. As mentioned above, a plurality of originals are sequentially conveyed to the line control unit 6 from the last page to the first page.

Figure 6:
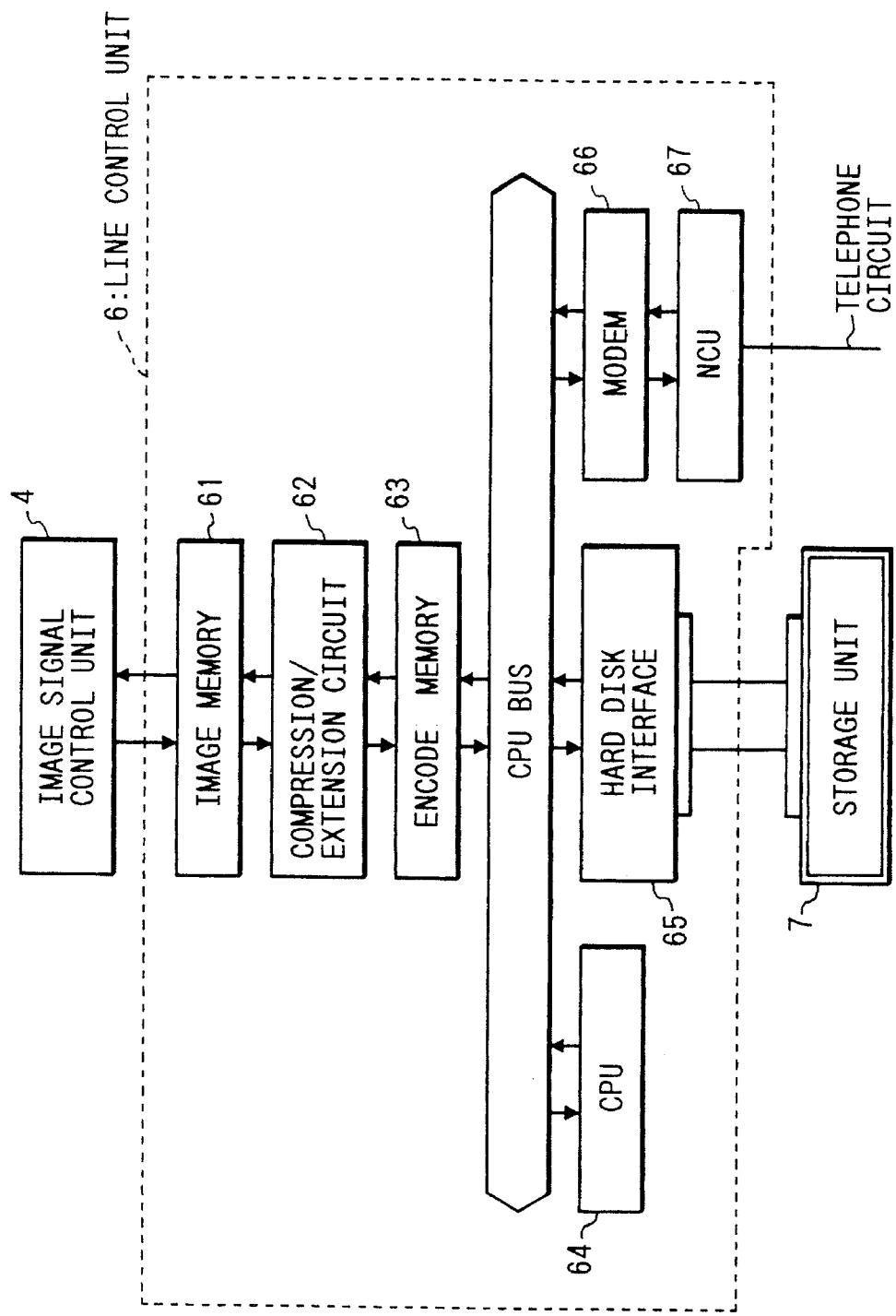
FIG. 6 is a block diagram showing a line control unit in the first embodiment.

FIG. 6 is a block diagram showing a construction of the line control unit 6.

The image information from the image signal control unit 4 is stored into an image memory 61 in the line control unit 6. The original information of the last page stored in the image memory 61 is compressed by a compression/extension circuit 62 and, after that, it is stored into an encode (encoding) memory 63.

A CPU 64 in the line control unit 6 reads out encoded information from the encode memory 63 in which the compressed and encoded information has been stored. The read-out encoded information is outputted to a hard disk interface 65 through a CPU bus. The hard disk interface 65 receives the encoded information and stores it into the storage unit 7.

The above operations are performed for all of the last to first pages of the originals. The whole original information is encoded and stored into the storage unit 7.

The CPU 64 of the line control unit 6 telephones through a modem 66 and an NCU 67 from the telephone number of the transmission partner which has been set by the operation unit 1. When the line of the partner is connected, the CPU 64 reads out the encoded information stored from the storage unit 7 from the first page through the hard disk interface 65. When the information of one page is completely transmitted by the modem 66 and the NCU 67, the CPU 64 reads out the information of the second page and transmits by operations similar to those mentioned above.

By repeating the above operations up to the last page, the information of the originals put on the document feeder 31 is transmitted to the transmission partner by using the telephone circuit.

According to the embodiment as mentioned above, a plurality of originals on the document feeder 31 can be copied and facsimile-transmitted by the single reading operation with a good operating efficiency without damaging the originals. There is also an advantage such that the copy end image which is important in the copying operation is discharged in a face-up state and, even in the facsimile transmission, the images are sequentially sent from the first page.

Figure 7:
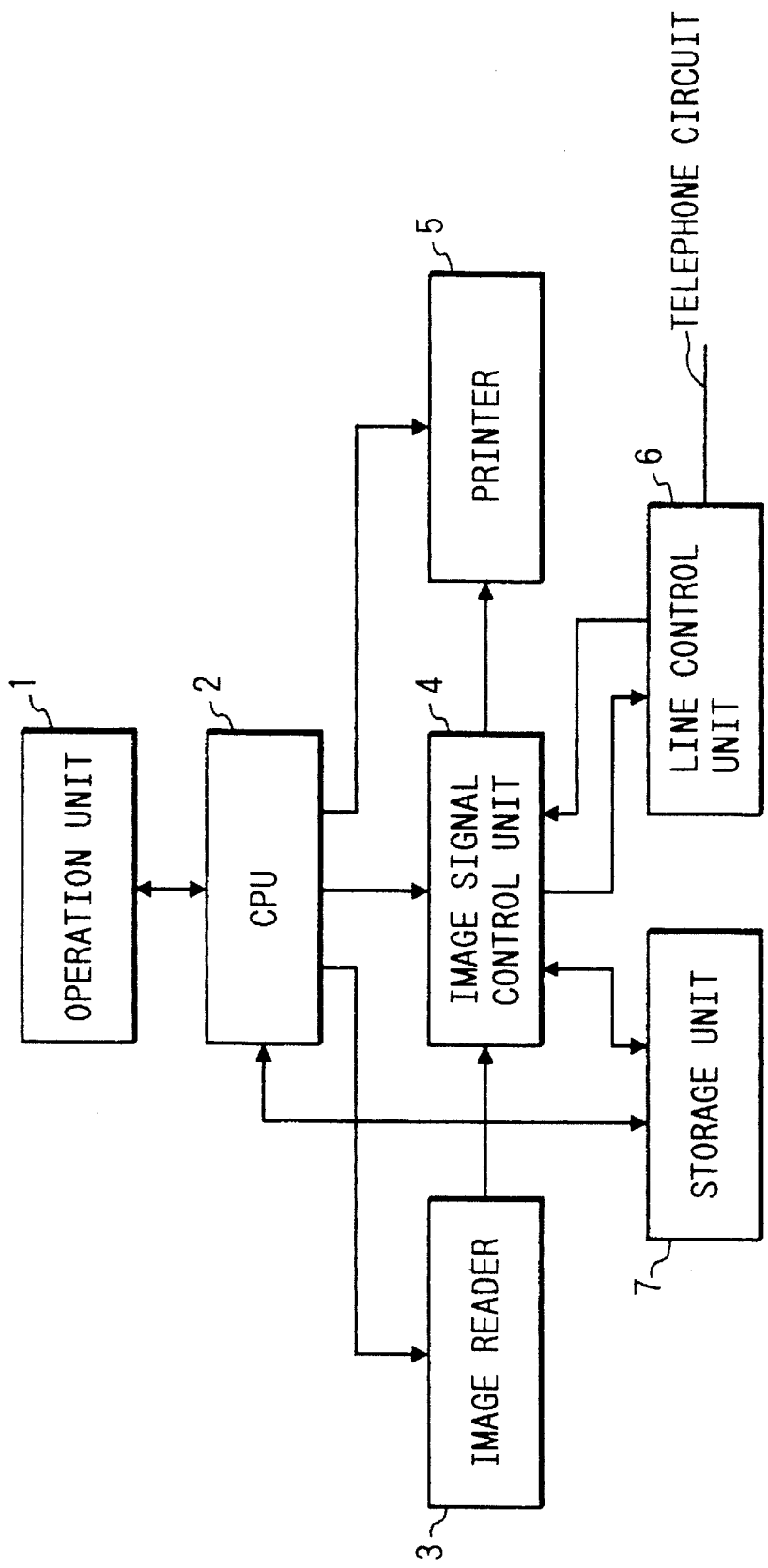
FIG. 7 is a block diagram showing the second embodiment of the invention.

FIG. 7 is a block diagram showing the second embodiment of the invention.

Even in an image processing system of the second embodiment, as fundamental component elements, the system has the operation unit 1, CPU 2, image reader 3, image signal control unit 4, printer 5, line control unit 6, and storage unit 7 and they are common to those in the first embodiment. However, in particular, the operation of each unit based on the control of the CPU 2 differs. That is, according to the second embodiment, the image information read out from the original by the image reader 3 is inputted to the line control unit 6 and the storage unit 7 through the image signal control unit 4 and the image data is transmitted from the line control unit 6. The image data is also read out from the storage unit 7 and sent to the printer 5, by which images are sequentially formed and outputted.

The second embodiment will now be described in detail hereinbelow. First, since the construction and operation in the operation unit 1 are similar to those in the first embodiment, they are omitted here.

In the image reader 3, the originals put on the document feeder 31 are sequentially conveyed onto the original supporting glass 32 one by one from the first page in the second embodiment. When the originals are conveyed, the lamp of the scanner section 33 is lit on and the scanner unit 34 is moved, thereby illuminating the original. The reflected light from the original is reflected by the mirrors 35, 36, and 37 and passes through the lens 38. After that, the reflected light enters the image sensor unit 39. The image signal sent to the image sensor unit 39, namely, the output signal from the image reader 3 is processed by the image signal control unit 4 which is controlled by the CPU 2. After that, the processed signal is outputted to the line control unit 6 and storage unit 7. For instance, a hard disk interface (not shown) for the storage unit 7 is provided in the image signal control unit 4.

Figure 8:
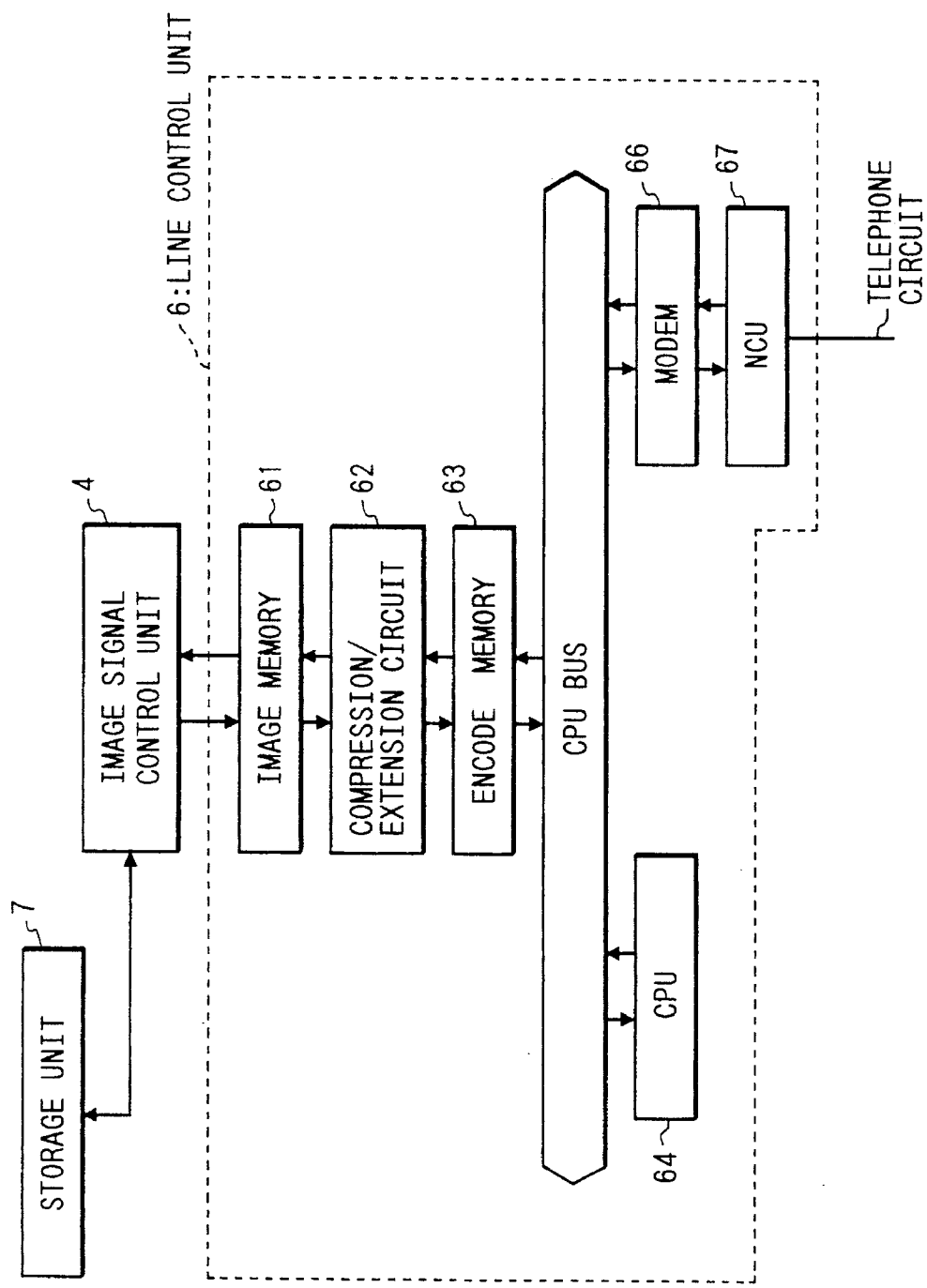
FIG. 8 ms a block diagram showing a line control unit in the second embodiment.

The image signal control unit 4, line control unit 6, and storage unit 7 in the second embodiment will now be described with reference to FIG. 8.

The CPU 2 sends the image information from the image reader 3 to the image signal control unit 4 from the contents set by the operation unit 1. The image signal control unit 4 sequentially sends the image information to the line control unit 6 and the storage unit 7 from the first page.

The image information from the image signal control unit 4 is sequentially stored into the image memory 61 of the line control unit 6 from the first page of the originals. The original information of the first page stored in the image memory 61 is compressed by the compression/extension circuit 62. After that, the compressed information is stored into the encode memory 63. The CPU 64 of the line Control unit 6 reads out the encoded image information from the encode memory 63 and transmits the encoded data to the modem 66 through the CPU bus. The modem 66 sequentially transmits the original information onto the telephone circuit through the NCU 67 from the first page.

The image information from the image signal control unit 4 has sequentially been stored in the storage unit 7 from the first page to the last page. The CPU 2 sequentially reads out the image information from the last page on the contrary and sends the read-out information to the image signal control unit 4. The image signal control unit 4 sequentially sends the information from the last page to the printer 5. The images are formed by the printer 5. Since the construction and operation of the printer 5 are similar to those in the first embodiment, their descriptions are omitted here.

The above operations will now be summarized. In the second embodiment, a plurality of originals put on the document feeder 31 are read out from the first page and the read-out image data is sequentially transmitted onto the telephone circuit by the line control unit 6 from the first page. After the image information from the first page was sequentially stored into the storage unit 7, the image information is sequentially read out from the last page to the first page and images are formed by the printer 5. That is, the images are formed from the last page and are discharged from the discharge unit 58 of the printer 5.

In case of copying a plurality of copy sheets, it is sufficient to read out the image information stored once in the storage unit 7 many times and to synthesize an image by the printer 5.

Although the first and second embodiments of the invention have been described above, a TV monitor can be also used as image forming means in the invention. A communication line such as LAN or the like which is used in the communication of a computer can be also used as transmitting means.

Figure 9:
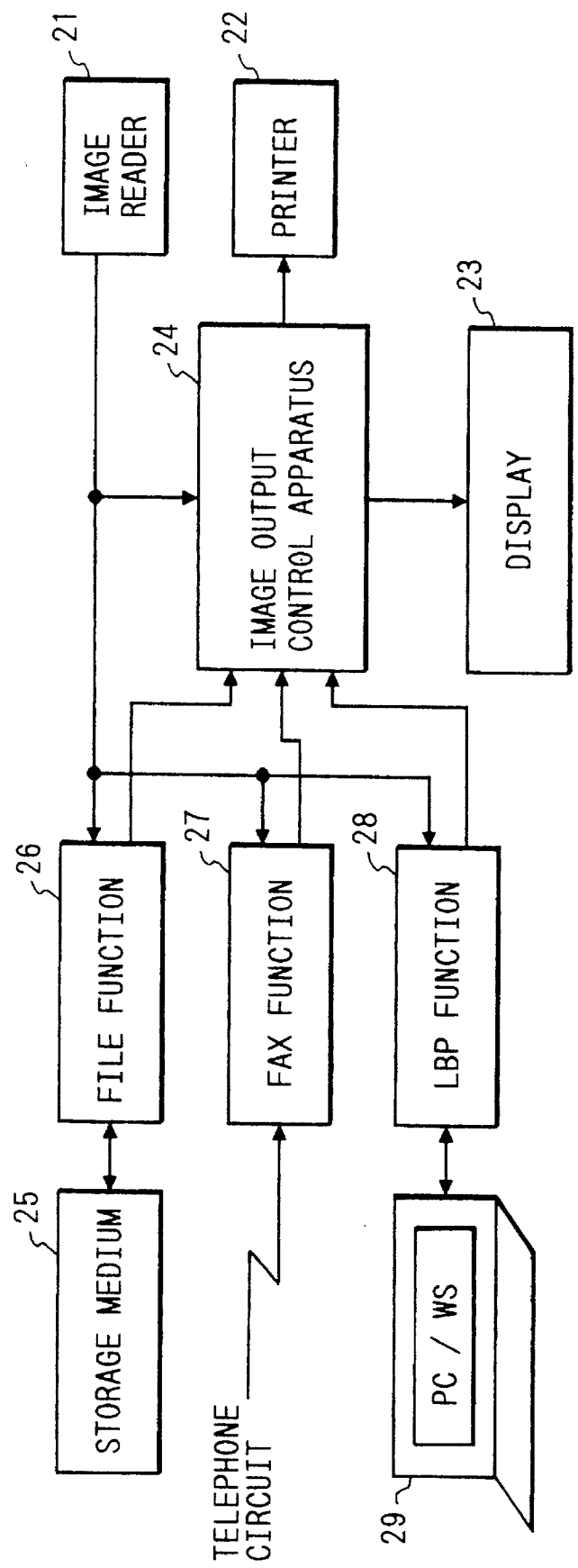
FIG. 9 is a functional block diagram showing a system outline in the third embodiment of the invention.

The third embodiment of the invention will now be described. FIG. 9 is a functional block diagram showing a concept of an overall construction of the third embodiment.

An image processing system of the third embodiment comprises: an image reader 21 for reading a common original in each of function units 26, 27, and 28, which will be explained hereinafter, and for converting it into image information; a printer 22 which has a plurality of kinds of recording paper cassettes and generates the image information onto the paper by print-out commands from the function units 26, 27, and 28; a display 23 to electrically display the image information as a visible image; and an image output control apparatus 24 for switching the image output signals from the function units 26, 27, and 28 to the printer 22 or the display 23.

The file function unit 26 stores the image information read out from the image reader 21 into a storage medium 25 and sends the image information stored in the storage medium 25 to the image output control apparatus 24. The facsimile function unit 27 compresses the image information derived from the image reader 21 to the information on the basis of the facsimile standards (MH, MR, MMR) and transmits the compressed information via a telephone circuit. The facsimile function unit 27 also extends the facsimile data sent from the telephone circuit and converts the data into the image information. Further, the LBP function unit 28 converts into image information a printer control command such as a page description language or the like sent from an external equipment such as a computer 29 or the like.

Figure 10:
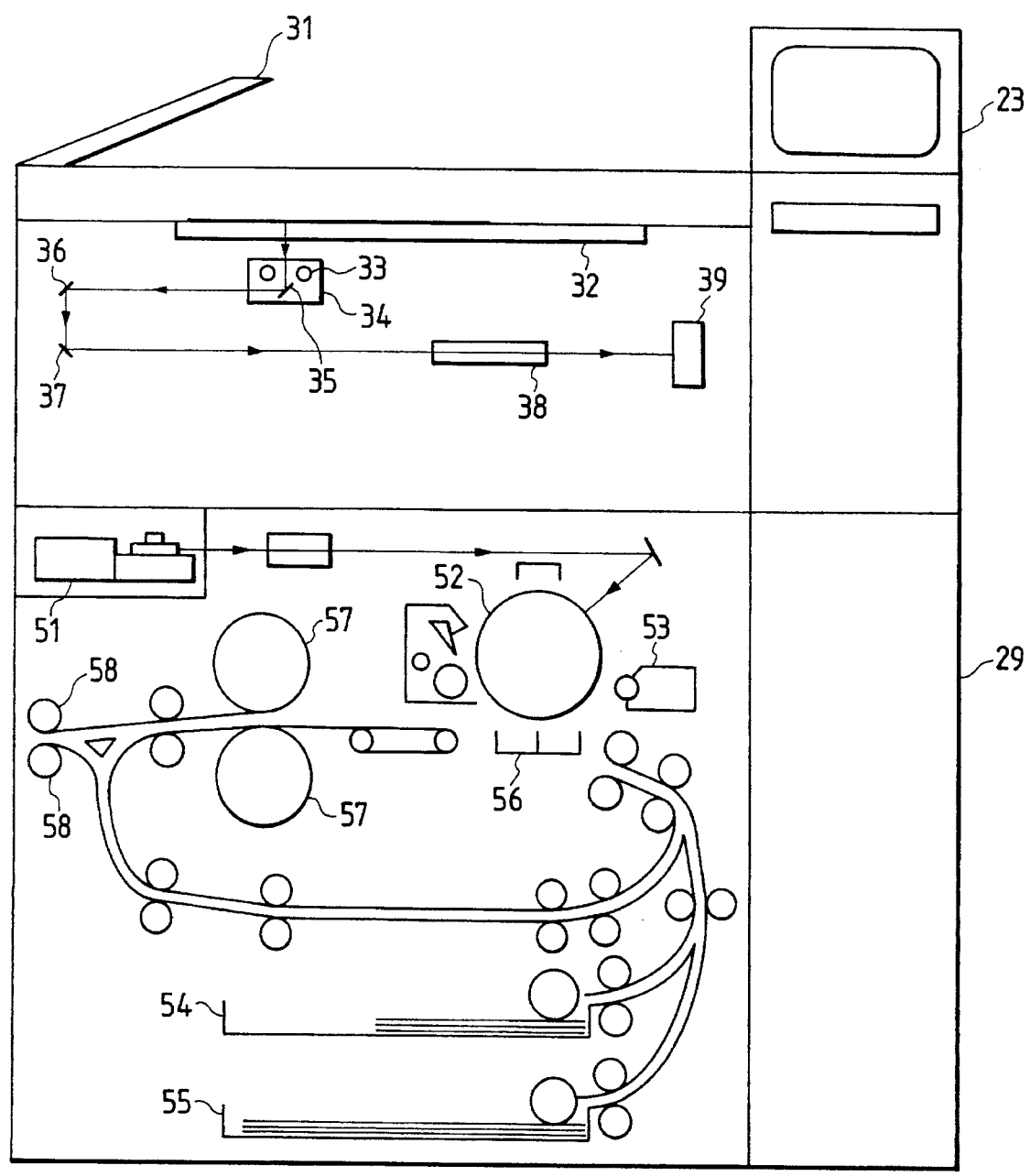
FIG. 10 is a cross sectional view showing a structure of the third embodiment.

FIG. 10 is a cross sectional view showing a structure of the system. As shown in the diagram, in the third embodiment, casings of the display 23, computer 29, and the like are provided in addition to the construction of the first embodiment (FIG.

Figure 11:
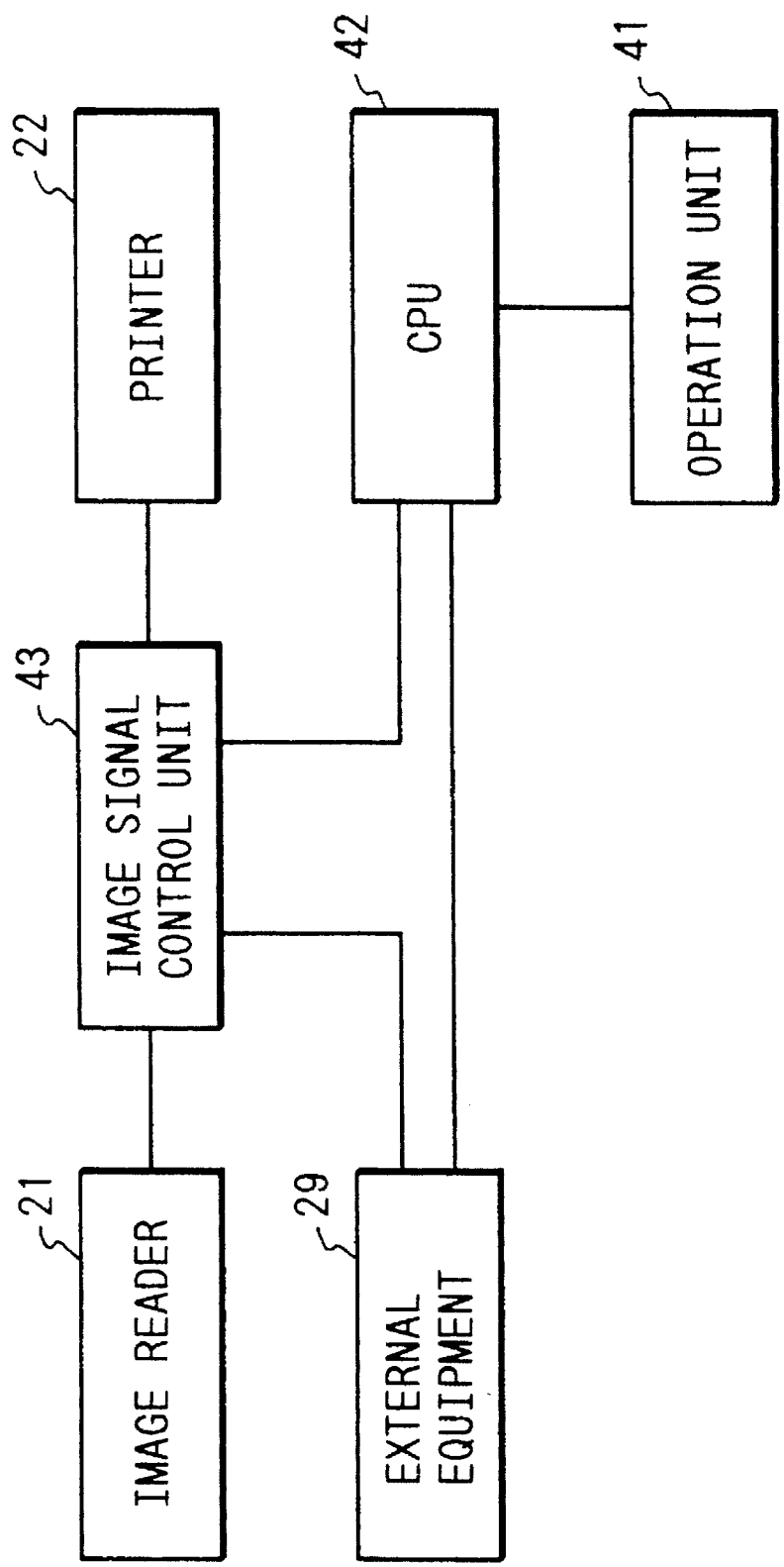
FIG. 11 is a block diagram showing a construction of a control system in the third embodiment.

FIG. 11 is a block diagram showing a construction of a control system in the third embodiment.

The image information which is supplied from the image reader 21, external equipment (computer) 29, or the like is sent to an image signal control unit 43 by the control of a CPU 42 on the basis of an instruction from an operation unit 41. A predetermined image process is executed and the processed image information is sent to the printer 22 and generated onto the recording paper.

Figure 12:
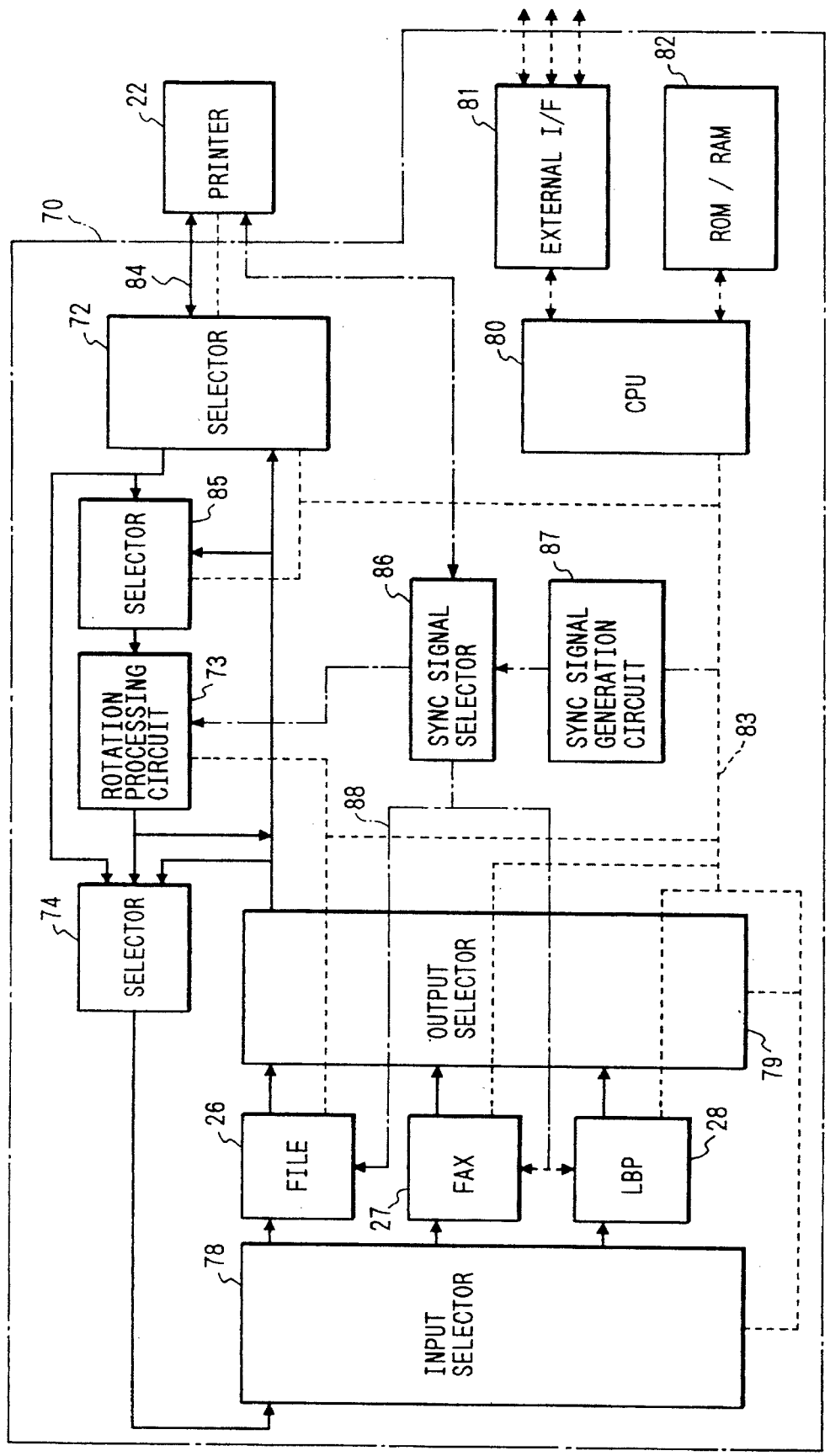
FIG. 12 is a block diagram showing a construction of an image information selection unit in the third embodiment.

FIG. 12 is a block diagram showing a construction of an input/output control unit 70 for selecting the image information from the function units 26, 27, and 28 and for inputting the selected information to the printer 22.

A processing procedure in case of filing an original will now be described with reference to FIG. 12.

First, a desired original is put on the original supporting glass 32 and various setting operations regarding the filing are executed. After that, by depressing the start key, the various set data is sent to a CPU 80 from the printer 22 through a selector 72 via a communication line 83. The set data is also similarly sent from the CPU 80 to the file function unit 26 by the communication line 83.

The file function unit 26 performs the setting operation in accordance with the set data and transmits a notification of the completion of the preparation to the CPU 80. In response to the preparation completion notification, the CPU 80 controls the selector 72 so that the image information is transferred in the direction from the printer 22 to a rotation processing circuit 73. Further, the CPU 80 controls a selector 74 and an input selector 78 so that the image information is transmitted from the rotation processing circuit 73 to the file function unit 26 through the selectors 74 and 78. In this manner, a series of image information transfer route is determined.

The CPU 80 transmits an image fetching preparation completion signal to the printer 22. In response to such a signal, the printer 22 starts the fundamental image forming operation for lighting on the lamp of the scanner section 33 and moving the scanner unit 34 and illuminating the original. An input signal from the image reader 21 is processed by the CPU 80 and passes through an image information line 84 and is supplied to the selector 72. The signal is sent to the file function unit 26 by the flow of the image information mentioned above.

In this instance, when it is necessary to rotate the overall image information, a rotation control is performed by the rotation processing circuit 73. When there is no need to rotate the image information, the signal is directly generated without being processed in the rotation processing circuit 73.

The file function unit 26 converts the image information into the structure according to the format of the storage medium 25 and records the converted information. After completion of the reading of the image information, a signal indicative of the end of reading is transmitted from the file function unit 26 to the CPU 80. When receiving the reading end signal, the CPU 80 controls the selector 72 so as to disconnect the printer 22 from the image information line. The CPU 80 subsequently transmits the reading end signal to the printer 22, so that the printer 22 is returned to the original state.

Even in case of facsimile transmitting the original, the image information is merely supplied to the facsimile function unit 27 in place of the file function unit 26 and the other operations are substantially the same as those in the above filing procedure.

The case of printing the filed original will now be described.

First, after various kinds of setting operations for printing were performed, by depressing the start key, the various set data is sent from the printer 22 to the CPU 80 through the selector 72 via the communication line 83. The set data is also similarly sent from the CPU 80 to the file function unit 26 through the communication line 83.

The file function unit 26 performs the setting operation in accordance with the set data and transmits a notification of the completion of the preparation to the CPU 80. When receiving such a notification, the CPU 80 controls an output selector 79 so that the image information flows in the direction from the file function unit 26 to the rotation processing circuit 73. Further, the CPU 80 shuts off the selector 74 and controls the selector 72 so that the image information flows from the rotation processing circuit 73 to the printer 22 through the selector 72. In this manner, a series of image information route is determined.

Subsequently, the CPU 80 transmits the notification indicative of the image output preparation completion to the printer 22. When receiving such a notification, the printer 22 starts the printing operation.

First, the image information is inputted to the image signal control unit 43 in FIG. 11. The signal inputted to the printer 22 is printed by the foregoing operation. In this instance, when it is necessary to rotate the overall image information, a rotation control is executed in the rotation processing circuit 73. When there is no need to rotate the overall image information, the signal is directly generated without being processed in the rotation processing circuit 73.

After completion of the printing operation, a print end notification is transmitted from the printer 22 to the CPU 80. When receiving such a notification, the CPU 80 controls the selector 72 so as to disconnect the printer 22 from the image information line. Subsequently, the CPU 80 transmits the print end notification to the file function unit 26, so that the file function unit 26 is returned to the original state.

The operation when generating the data which is transmitted from the computer 29 will now be described.

When the foregoing printer control command is transmitted from the computer 29, it is sent to the LBP function unit 28 through an external interface 81 and the CPU 80. When receiving the printer control command, the LBP function unit 28 develops the image information into a memory in the LBP function unit 28 in accordance with a printer control command system. After completion of the development of the image information, a CPU in the LBP function unit 28 generates a request for output of the image information to the CPU 80. A flow of the subsequent processes is similar to that in case of printing out the filed original. Even in case of printing the image information which has been facsimile received, the image information is merely generated from the facsimile function unit 27 in place of the file function unit 26 and the other processes are substantially the same as those in the case where the image information is generated from the file function unit 26.

A processing procedure in case of facsimile transmitting the filed original will now be described.

First, after various kinds of setting operations to facsimile transmit a desired file were performed, by depressing the start key, the various set data is sent from the printer 22 to the CPU 80 through the selector 72 via the communication line 83. The set data is similarly sent from the CPU 80 to the file function unit 26 and the facsimile function unit 27 via the communication line 83. On the basis of the transmitted set data, the file function unit 26 and the facsimile function unit 27 execute the setting operations in accordance with them and transmit the preparation completion notification to the CPU 80. When receiving such a notification, the CPU 80 controls the output selector 79 so that the image information flows in the direction from the file function unit 26 to the rotation processing circuit 73. Further, the CPU 80 controls the selector 74 and the input selector 78 so that the image information flows from the rotation processing circuit 73 to the facsimile function unit 27 through the selector 74. In this manner, a series of image information route is determined.

Subsequently, the CPU 80 transmits a notification indicative of the completion of the image output preparation to the file function unit 26. When receiving such a notification, the file function unit 26 starts the image information transmitting operation. In this instance, when it is necessary to rotate the overall image information, a rotation control is performed in the rotation processing circuit 73. When there is no need to rotate the image information, the signal is directly generated without being processed in the rotation processing circuit 73.

After completion of the transmission, the transmission end notification is transmitted from the file function unit 26 to the CPU 80. When receiving such a notification, the CPU 80 controls the output selector 79 so as to disconnect the facsimile function unit 27 from the image information line. After that, the CPU 80 transmits the transmission end notification to the facsimile function unit 27, so that the facsimile function unit 26 is returned to the original state.

Even in case of filing the image information which has been facsimile received or in case of filing the data sent from the computer 29 or in case of facsimile transmitting the data sent from the computer 29, the operations are executed in substantially the same manner as those in the above embodiment except that the flow of the image information is merely changed.

Explanation will now be made with respect to the operation in the case where there is a print request by another function during the printing-out operation by a certain function in the embodiment.

Figure 13:
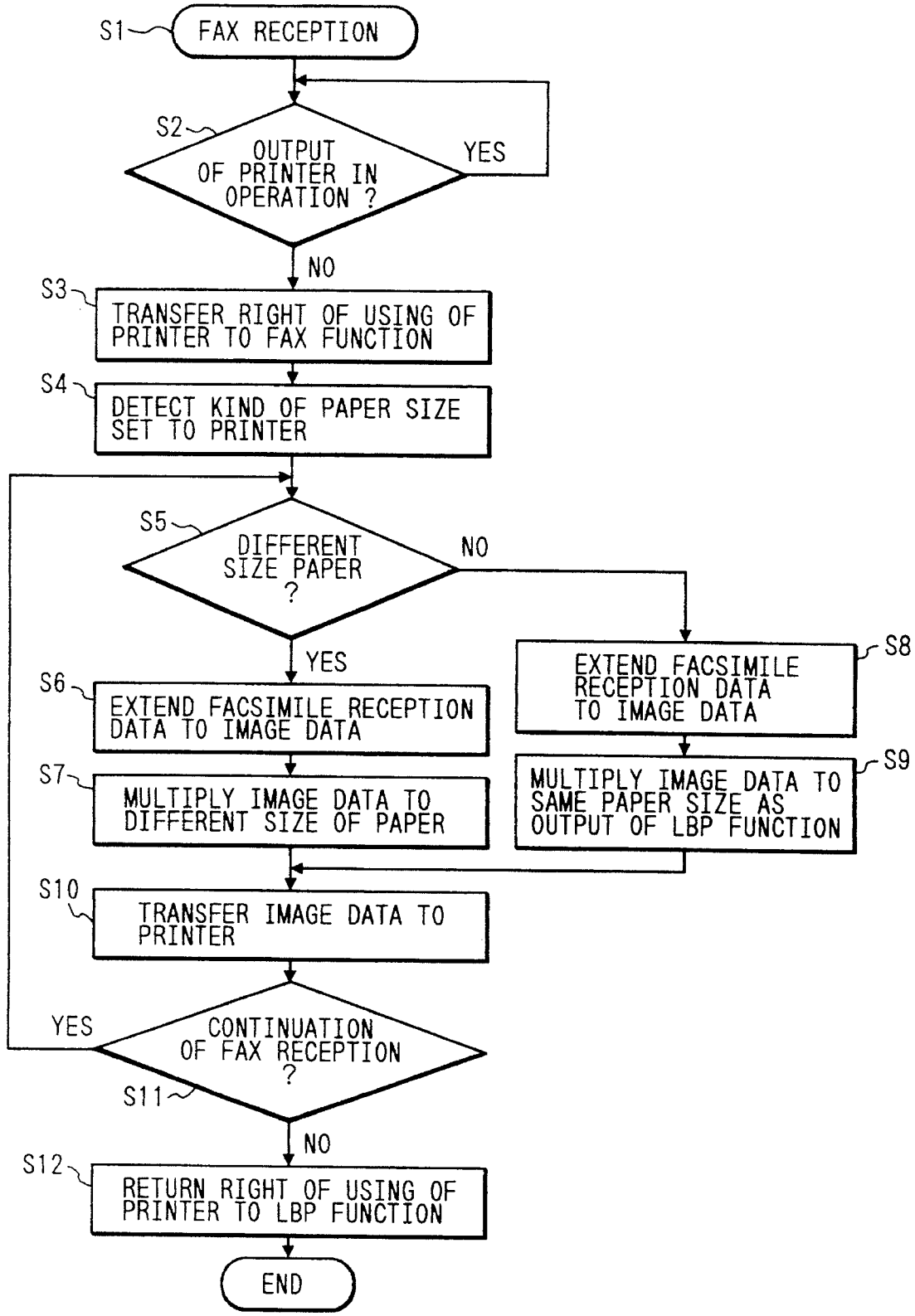
FIG. 13 is a flowchart showing the operation of the third embodiment.

FIG. 13 is a flowchart showing the operation in the case where the facsimile data is received by the facsimile function while the image data is being printed out by the printer 22 by the LBP function.

First, when the facsimile data is received by the facsimile function during the use of the printer 22 by the LBP function (step S1), a check is made to see if the printer 22 is at present generating the image data or not (S2). After the recording paper which is at present being generated was discharged, a right of using of the printer 22 is transferred to the facsimile function (S3). This is because in order to eliminate an inconvenience such that the data cannot be received in the facsimile reception mode since the printer 22 is used by the LBP function, a use priority of the printer 22 in the facsimile function is set to be higher than that in the LBP function.

A check is now made to see if a paper of the size different from the size of paper to which the data had been generated until now by the LBP function or a paper of a different direction has been set at present or not (S4). That is, when the facsimile data is received by the facsimile function while the data is being printed out in the longitudinal direction of the A4 size by the LBP function, a check is made to see if the paper of the size other than the size of the A4 longitudinal direction has been set to the printer or not.

When the paper of the different size is set (S5), the facsimile reception data is extended to the image information (S6). After that, the image information is multiplied in accordance with the different paper size (S7). If the paper of the different size is not set, the facsimile reception data is extended to the image information (S8). After that, the image information is multiplied to the same paper size as that in the case where the data has been being generated by the LBP function (S9).

The image information multiplied in step S7 or S9 is transferred to the printer 22 and printed out (S10). In the case where there is still a continuation of the facsimile reception (S11), the processing routine is returned to step S5 and the processes are repeated. After completion of the facsimile reception, the right of using of the printer 22 which has been transferred to the mfacsimile function in step S3 is returned to the LBP function and the printing-out by the LBP function is subsequently restarted (S12). The processes in case of the different size has been mainly described in FIG. 13. However, even in case of changing the output direction of the image information, the image data is multiplied in accordance with the paper size of the different direction in step S7. When the data is generated to the printer 22, by making the rotation processing circuit 73 operative, the image data can be printed by a similar procedure.

Figure 14:
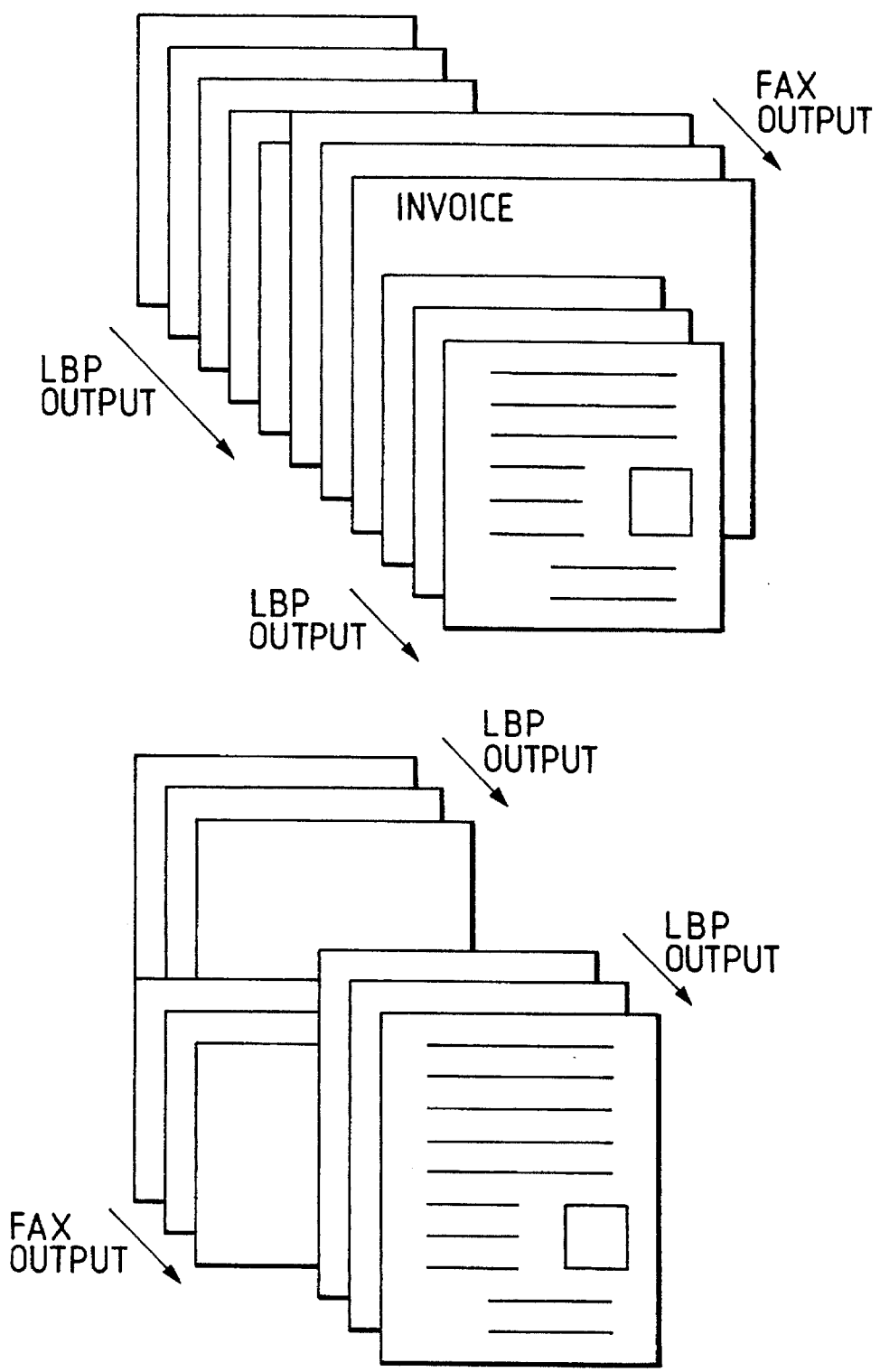
FIG. 14 is a diagram showing an example of an output state in the third embodiment.

By providing the mechanism as mentioned above, it is possible to easily confirm that the original which had been outputted at the different size or in the different direction is the original received by the facsimile function. FIG. 14 is a diagram for explaining a stacking state of the originals outputted according to the third embodiment. As shown in the diagram, by outputting only the facsimile reception originals at different sizes or in different directions, the originals can be easily sorted without causing a confusion.

Figure 15:
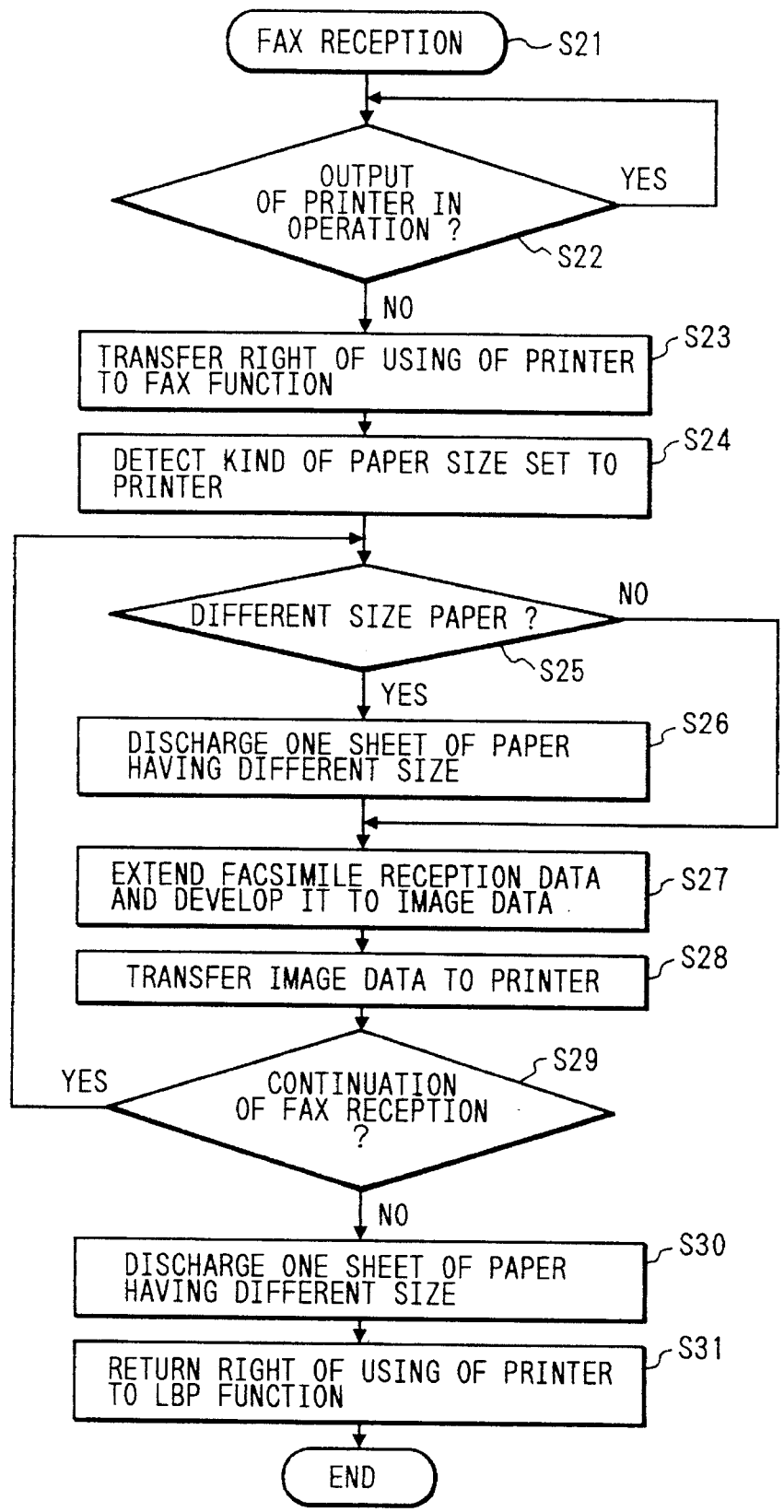
FIG. 15 is a flowchart showing the operation of the fourth embodiment of the invention.

The fourth embodiment of the invention will now be described. FIG. 15 is a flowchart showing the operation of the fourth embodiment.

In the above third embodiment, there is provided the function to output the original at a paper size different from that when the original has been generated by the LBP function in case of printing out the facsimile reception image. In the fourth embodiment, however, in the case where the operator wants to also generate the facsimile reception image at the same paper size as that of the image which has been outputted by the LBP function, only one sheet of paper of a different size is generated between the original outputted by the LBP function and the original outputted by the facsimile function, thereby providing a partition.

In FIG. 15, processes in steps S21 to S25 are common to those in steps S1 to S5 in FIG. 13. In step S25, when there is a paper of a size different from that of the paper which has been outputted by the LBP function, only one sheet of such a paper is discharged in a blank state (S26). After that, the facsimile reception data is developed to the image information (S27) and is outputted at the same paper size as that of the paper which has been outputted by the LBP function (S28).

All of the facsimile reception images are printed out (S29). When the right of using of the printer 22 is returned from the facsimile function to the LBP function, the paper of the same size as that of the paper outputted in step S26 is again outputted (S30). The printing-out by the LBP function is restarted (S31).

Figure 16:
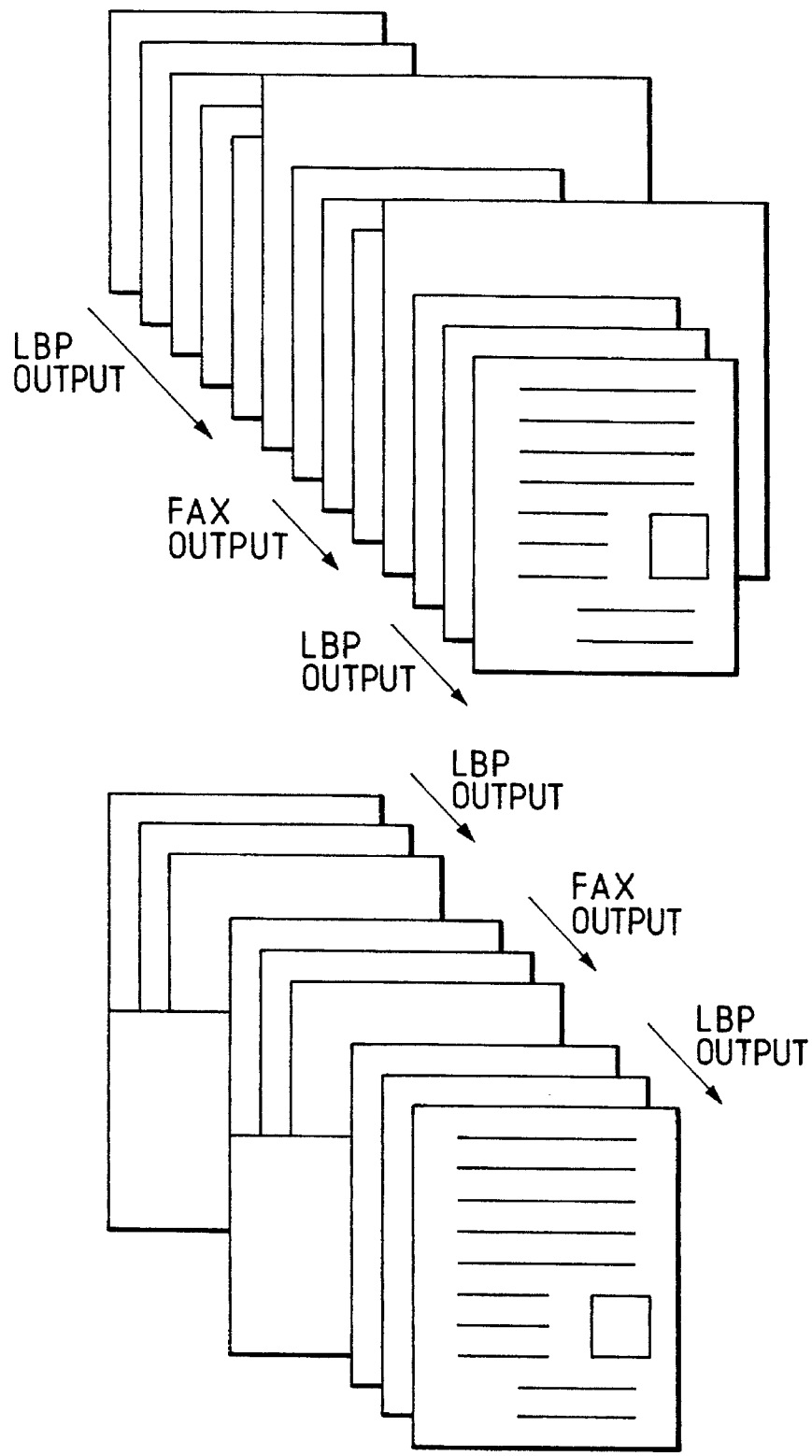
FIG. 16 is a diagram showing an example of an output state in the fourth embodiment.

With the construction as mentioned above, for example, as shown in FIG. 16, it is possible to easily confirm that the output original sandwiched by the papers of different sizes is the original which has been received by the facsimile function. An effect similar to that mentioned above is derived.

Figure 17:
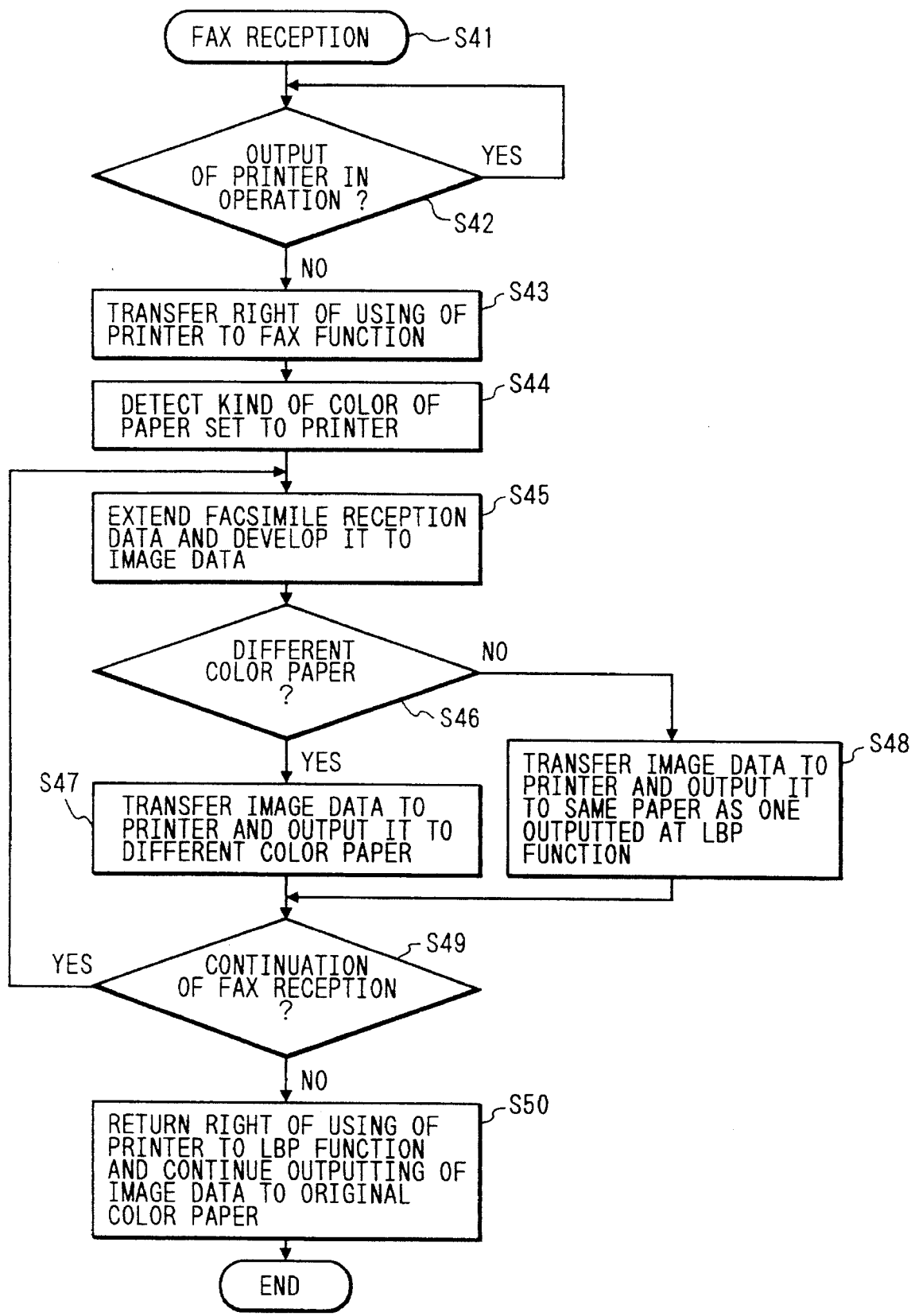
FIG. 17 is a flowchart showing the operation of the fifth embodiment of the invention.

The fifth embodiment of the invention will now be described. FIG. 17 is a flowchart showing the operation of the embodiment.

In the above third embodiment, when the facsimile image is printed out, the function to output the image at the paper in size different from that of the paper which has been outputted by the LBP function is provided. According to the fifth embodiment, however, a recording paper of a different color is loaded in the printers 22. When the facsimile original is outputted, it is outputted by the recording paper of a different color.

That is, in step S44 in FIG. 17, the kind of color of the paper set in the printer 22 is detected (S44). After the facsimile reception data was developed (S45), when there is a paper of a color different from the color of the paper which is being outputted, the facsimile reception image is outputted by the paper by such a different color (S47). Since the other operations are substantially similar to those in the third embodiment, their detailed descriptions are omitted here.

Figure 18:
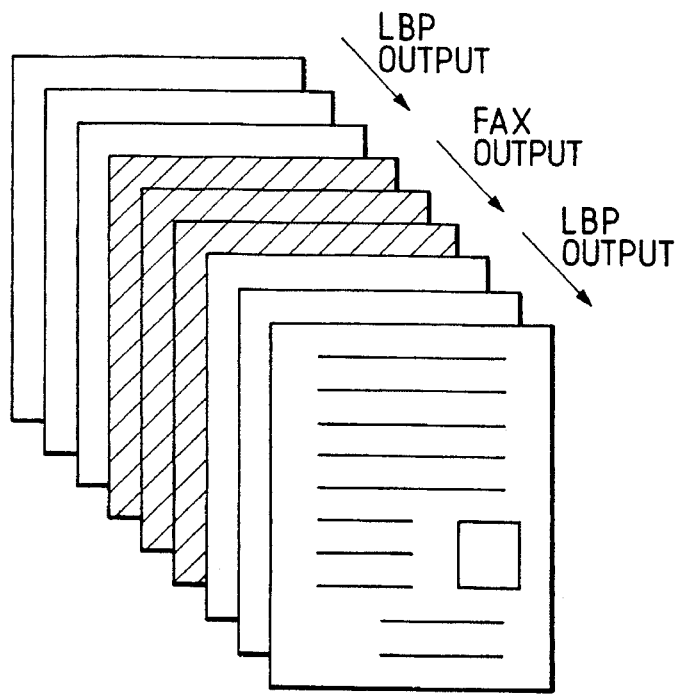
FIG. 18 is a diagram showing an example of an output state in the fifth embodiment.

With the above construction, for instance, as shown in FIG. 18, it is possible to easily recognize which ones of the originals discharged in a lump to the printer 22 are the facsimile originals. An effect similar to that mentioned above is obtained.

Figure 19:
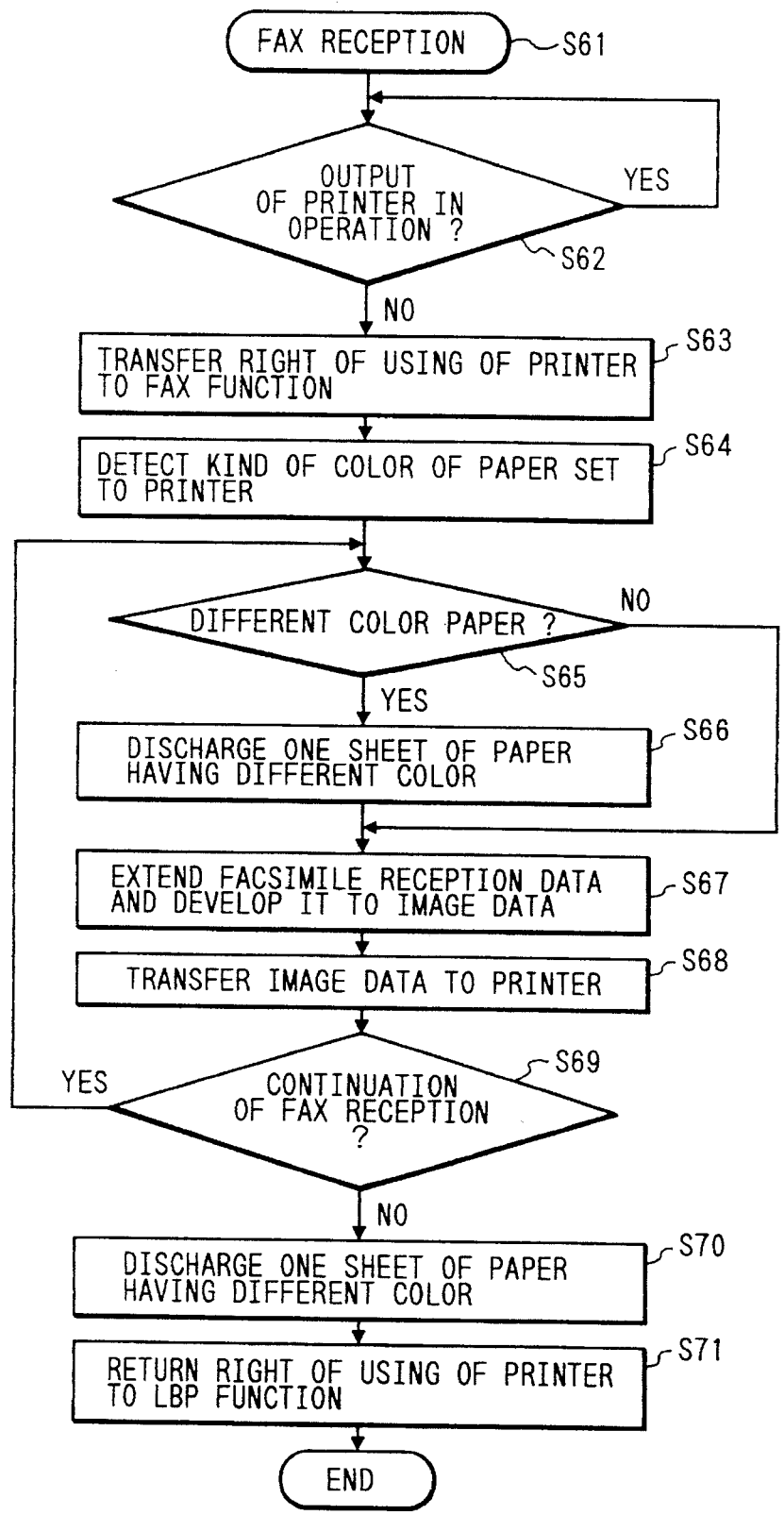
FIG. 19 is a flowchart showing the operation of the sixth embodiment of the invention.

The sixth embodiment of the invention will now be described. FIG. 19 is a flowchart showing the operation of the embodiment.

In the fifth embodiment, in case of outputting an image by the facsimile function, the image is outputted by the recording paper of a different color. In the sixth embodiment, however, a paper of a different color is inserted at a boundary between the output original by the facsimile function and the output original by the LBP function, thereby providing a partition.

That is, in FIG. 19, when the right of using of the printer 22 is transferred from the LBP function to the facsimile function (S63), the kind of color of the paper set in the printer 22 is detected (S64). When there is a paper of a color different from that of the paper which is being outputted (S65), only one sheet of paper of such a different color is discharged (S66).

After completion of the facsimile reception (S69), when the right of using of the printer 22 is returned from the facsimile function to the LBP function, one sheet of paper of a different color is again discharged (S70). Since the other operations are substantially similar to those in the third embodiment, their detailed descriptions are omitted here.

Figure 20:
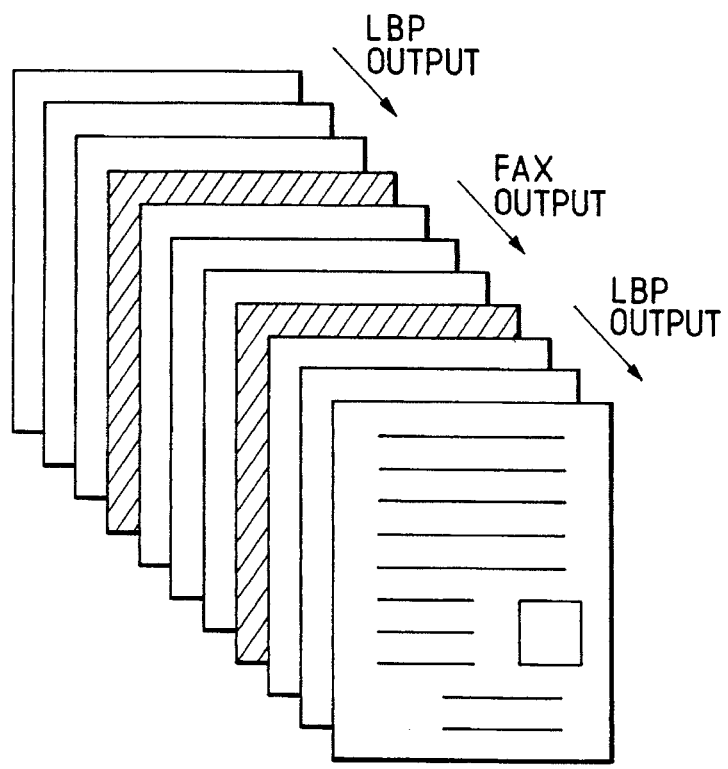
FIG. 20 is a diagram showing an example of an output state in the sixth embodiment.

With the above construction, for example, as shown in FIG. 20, it is possible to easily recognize which ones of the originals discharged in a lump to the printer 22 are the facsimile orginals. An effect similar to that mentioned above is obtained.

Although the third to sixth embodiments have been described with respect to the example in which there is an interruption of the facsimile function during the operation of the LBP function, the invention can be also applied to an interruption of the copy function during the LBP function, an interruption of the copy function during the facsimile function, an interruption of the facsimile function during the copy function, or the like. That is, the paper can be individually discharged in accordance with the facsimile unit, LBP unit, reader unit, file unit or the like. The paper can be also individually discharged every job.

The seventh embodiment of the invention will now be described.

According to the seventh embodiment, for instance, when the operator wants to obtain N outputs from the same image information, N synthesizing image information to be synthesized are respectively individually prepared for the N outputs. The first synthesizing image information is synthesized to the first output. The second synthesizing image information is synthesized to the second output. In this manner, such an operation is repeated until the Nth output. Due to this, the troublesomeness and time which are required for the works in case of inserting different characters or picture other than the serial number with respect to each of a plurality of outputs from the same original can be reduced.

FIG. 21 is a block diagram showing a construction of the seventh embodiment.

As shown in the diagram, an image processing system of the embodiment has the operation unit 1, CPU 2, image reader 3, image signal control unit 4, printer 5, and storage unit 7. The fundamental functions of those units are substantially the same as those of the units designated by the same reference numerals in the first embodiment (FIG. 1).

Figure 22:
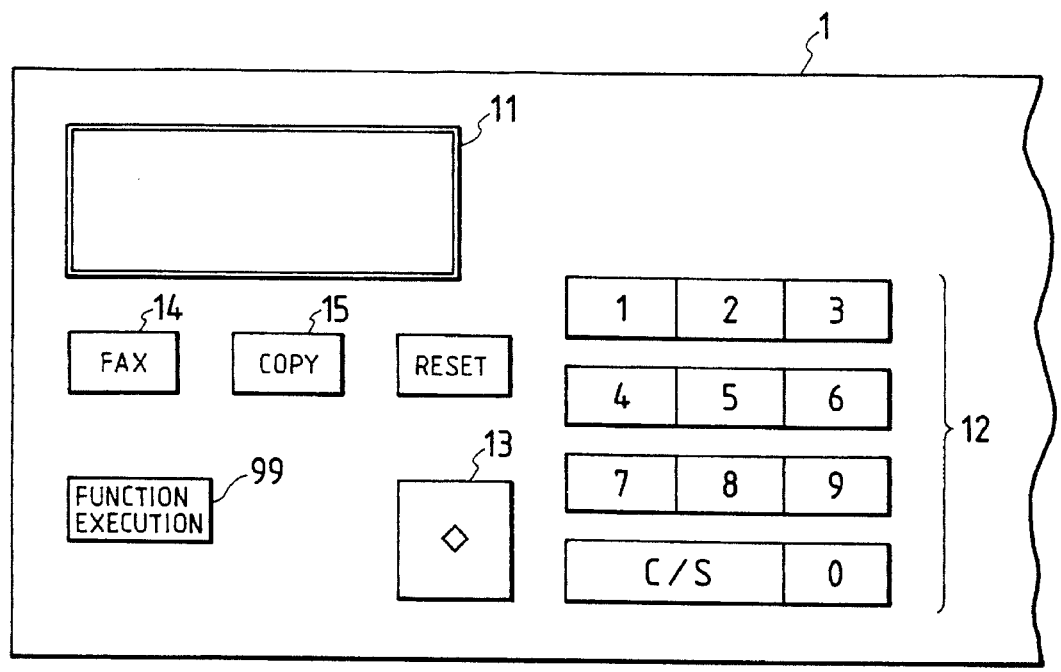
FIG. 22 is a plan view showing an operation unit in the seventh embodiment.

FIG. 22 is a plan view showing a construction of the operation unit 1.

In addition to the construction shown in FIG. 2, the operation unit 1 of the seventh embodiment has a function execution key 99 to instruct the execution of a process that is peculiar to the embodiment.

Figure 23:
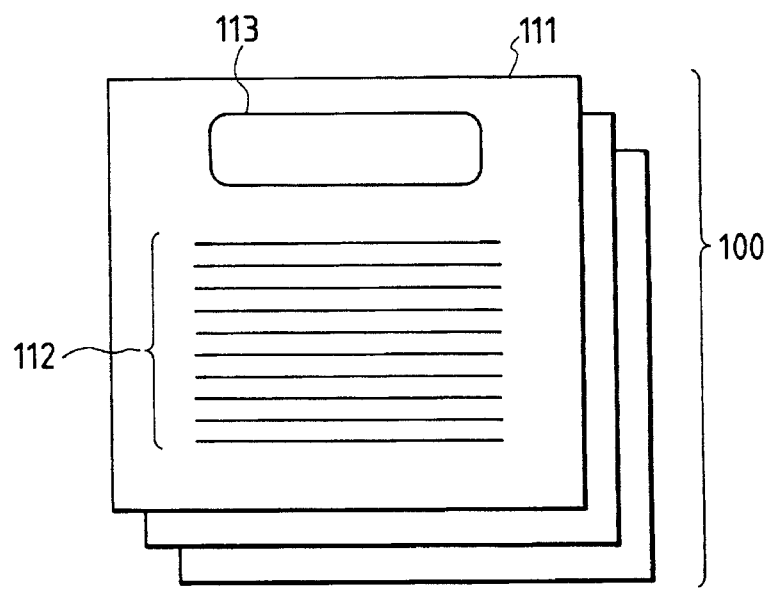
FIG. 23 is a diagram showing an example of an original which is copied in the seventh embodiment.

FIG. 23 is a diagram showing an example of originals 100 to be copied in the seventh embodiment.

The originals 100 are the originals of total M pages. Among them, an original 111 of the first page is provided with a region 113 in which a position at which another image is synthesized upon generation by the copy in addition to an inherent image 112 has been designated by a marker for range designation.

Figure 24:
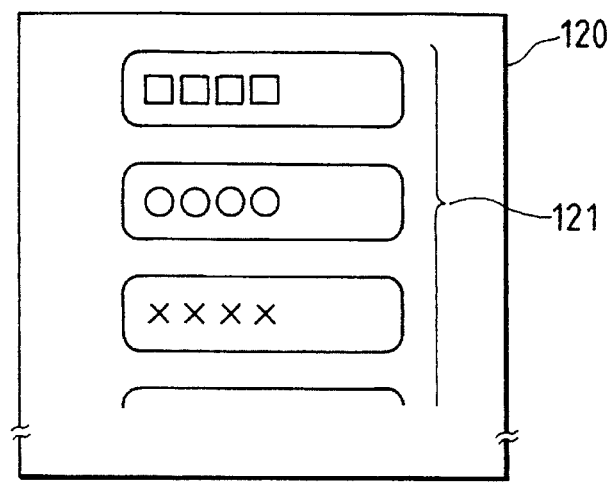
FIG. 24 is a diagram showing an original on which a list of images to be synthesized has been written according to the seventh embodiment.

On the other hand, FIG. 24 is a diagram showing an original 120 on which a list of images 121 to be synthesized into the region 113 has been written.

In the embodiment, the images 121 of the original 120 are sequentially synthesized to the region 113 regarding the copy output in accordance with the set copy sheet number.

Figure 25:
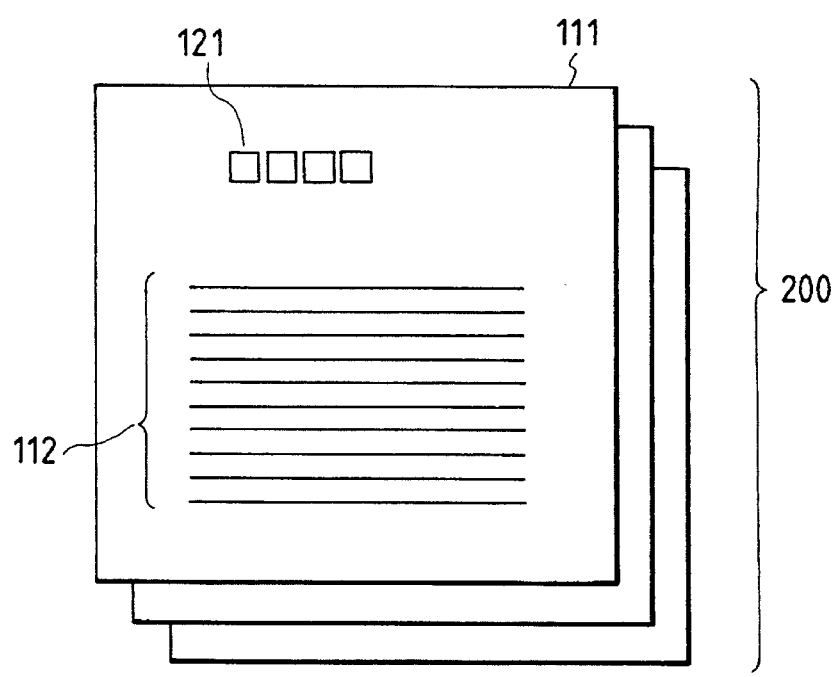
FIG. 25 is a diagram showing a state of an output original in the seventh embodiment.

FIG. 25 is a diagram showing a state of an output original 200 in which the images shown in FIG. 24 have been synthesized to the region 113 shown in FIG. 23.

An operating procedure of the embodiment will now be described. First, the function execution key 99 is depressed, the execution of tile function in the embodiment is set, and a registration number N is set by using the ten-key 12. On the other hand, the region 113 in which the images are synthesized is designated on the original 100 by the marker for range designation. N images 121 to be synthesized are written onto the original 120 and are respectively enclosed by the range designating markers.

The original 100 is subsequently set to the image reader 3. Further, the original 120 is put on the original 100. By depressing the start key 13, the image reader 3 reads the originals 100 and 120. The read image information is stored into the storage unit 7 through the image signal control unit 4. In this instance, the image information from the original 100 and the image information from the original 120 are stored as individual image information. The position of the region 113 designated by the marker is also read. The images 121 as image information from the original 120 are further stored as N individual image information every image enclosed by the range designating marker. Reference numerals 1 to N are sequentially numbered to those N image information in accordance with the order form the top.

The image information from the original 100 stored in the storage unit 7 is outputted as a visible image by the printer 5 through the image signal control unit 4 from the image information of the Mth page. The above operations are repeated with respect to the pages from the Mth page to the second page. When the image information of the first page is sent to the image signal control unit 4, the first image information of the images 121 stored in the storage unit 7 is sent to the image signal control unit 4 and is synthesized to the position on the region 113 of the image information of the first page which has already been sent. The synthesized image is outputted from the printer 5.

In the output original 200, the image 112 on the original 100 and the first one of the images 121 on the original 120 are synthesized as shown in FIG. 25. In this manner, the first output is completed. By the same procedure as that mentioned above, with respect to the second output, the second image information of the images 121 is synthesized and outputted. The above operations are repeated until the Nth image information of the images 121 is synthesized to the Nth output and the synthesized information is outputted.

In the above embodiment, arbitrary different images can be synthesized to each of a plurality of copy outputs in the copy mode since the range of the image to be synthesized and the position at which the image is synthesized can be designated by using the marker, the synthesizing position and size of the image can be freely arranged and determined.

Figure 26:
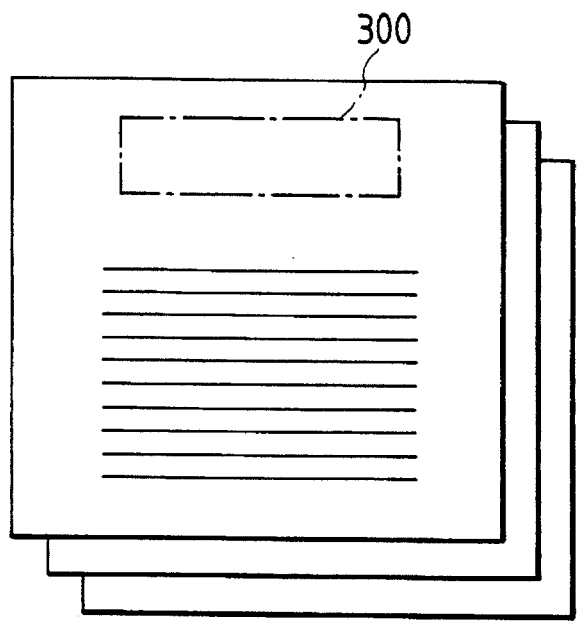
FIG. 26 is a diagram showing an example of an original which is copied in the eighth embodiment of the invention.
Figure 27:
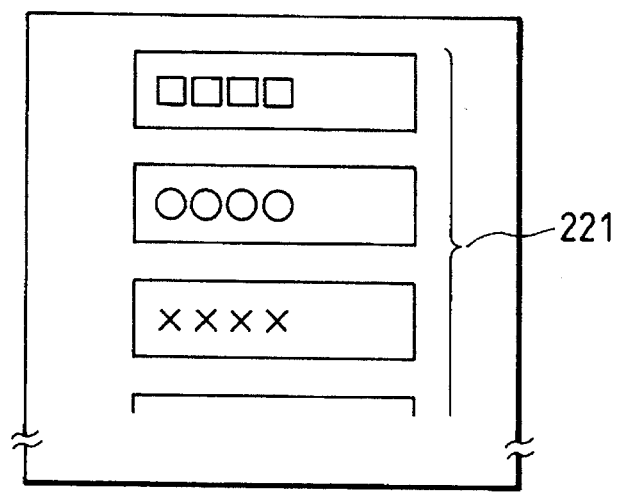
FIG. 27 is a diagram showing an original on which a list of images to be synthesized has been written according to the eighth embodiment.

The eighth embodiment of the invention will now be described. FIG. 26 is a diagram showing an original of the embodiment. A region 300 in the diagram indicates a predetermined image synthesizing position upon generation and this portion is set to a blank area. FIG. 27 shows a dedicated fixed size paper in which the position to which images to be synthesized are written has been designated by a fixed size frame. Images 221 correspond to the images 121 in FIG. 24 and are images for synthesis which have been written in the frame.

In the seventh embodiment, the image synthesizing position has been designated by the range designating marker. In the eighth embodiment, however, as shown in FIG. 26, such a position has been predetermined as a region 300. On the other hand, although the images to be synthesized have been designated as ranges by the markers in the seventh embodiment, such images are written into a preset frame as shown in FIG. 27 in the eighth embodiment. The eighth embodiment differs from the seventh embodiment with respect to the above two points and the other operating method and operation and the like are substantially the same as those of the seventh embodiment.

According to the eighth embodiment as mentioned above, arbitrary different images can be synthesized in a predetermined range with respect to each of a plurality of copy outputs in the copy mode. Further, the mechanism to read the position by the marker and the designation of the range which was necessary in the seventh embodiment becomes unnecessary. A simpler apparatus can be obtained.

As described above, in case of processing a plurality of originals, the image information read by the image reading means is outputted as a visible image by the image forming means and is transmitted onto a line by the transmitting means. Thus, the copy and the facsimile transmission of the original can be easily executed by a single reading operation.

In the case where the image output requests are outputted from different means during the output of the image information obtained from the transmitting means, input means, or the like, the kind of image output medium loaded in the image forming means at this time point is detected. The kind of image output medium is changed and the image information is generated. Due to this, different image outputs can be easily sorted.

Further, in case of obtaining a plurality of image outputs from the same image information, by providing a mode for synthesizing different images and generating for each of the image outputs, a plurality of images having partially different portions can be easily obtained.

What is claimed is:

1. An image forming apparatus comprising:

first enclosing means for enclosing rectangular sheets in a first direction;

second enclosing means for enclosing rectangular recording sheets in a second direction which differs from said first direction by 90°;

input means for inputting first image data from a first device and for inputting second image data from a second device in said first direction, respectively;

rotating means for rotating the image data input from said input means in said second direction; and image forming means for forming an image based on image data input from said input means onto the recording sheet enclosed in said first enclosing means or onto the recording sheet enclosed in said second enclosing means, wherein said image forming means automatically changes the recording sheet for image formation from the recording sheet enclose in said first enclosing means to the recording sheet enclosed in said second enclosing means in accordance with the change of an image forming operation based on the first image data input from said first device to an image forming operation based on the second image data input from said second device, so that the image based on the second image data rotated by said rotating means is formed on the recording sheet enclosed in said second enclosing means.

2. An apparatus according to claim 1, wherein the functions of said first device and said second device are different from each other.

3. An apparatus according to claim 2, wherein each of said functions is either a copy function, a facsimile function, a file print function for printing an image preserved, or a printer function for printing an image from a computer.

4. An image forming apparatus comprising:

first enclosing means for enclosing recording sheets on a first type;

second enclosing means for enclosing recording sheets of a second type different from said first recording sheets;

input means for inputting first image data from a first device and for inputting second image data from a second device; and image forming means for forming an image based on image data input from said input means onto recording sheets enclosed in the first enclosing means or the recording sheet enclosed in the second enclosing means, wherein said image forming means changes the recording sheet for image formation from the recording sheet enclosed in said first enclosing means to the recording sheet enclosed in said second enclosing means in accordance with the change of an image forming operation based on the first image data input from said first device to an image forming operation based on the second image data input from said second device, so that the image based on the second image data is formed on the recording sheet enclosed in said second enclosing means.

5. An apparatus according to claim 4, wherein the functions of said first device and said second device are different from each other.

6. An apparatus according to claim 5, wherein each of said functions is either a copy function, a facsimile function, a file print function for printing an image preserved, or a printer function for printing an image from a computer.

7. An image forming apparatus comprising:

first enclosing means for enclosing sheets of a first type;

second enclosing means for enclosing sheets of a second type different from said first recording sheets;

input means for inputting the first image data from a first device and for inputting second image data from a second device; and image forming means for forming an image based on image data input from said input means onto recording sheets enclosed in the first enclosing means, wherein said image forming means automatically discharges the recording sheet enclosed in said second enclosing means when said first image data from the first device is changed to to said second image data from the second device.

8. An apparatus according to claim 7, wherein the functions of said first device and said second device are different from each other.

9. An apparatus according to claim 8, wherein each of said functions is either a copy function, a facsimile function, a file print function for printing an image preserved, or a printer function for printing an image from a computer.

10. An image processing apparatus comprising:

original feeding means for sequentially feeding N originals stacked sequentially in accordance with the order from the first page to the Nth page to an exposing position one sheet by one in accordance with the descending order of the Nth page, (N–1)th page, . . . , second page, and first page;

reading means for reading an image of the original which is exposed at said exposing position;

storage means which can store image data of said N originals which are read by said reading means;

recording means for recording the image data read by said reading means onto a recording sheet and for discharging the recording sheet in a state in which a recording surface is upside up;

transmitting means for facsimile-transmitting the image data read by the reading means; and control means for controlling in a manner such that the image data read by the reading means is sequentially outputted to said recording means and said storage means in accordance with the descending order of the Nth page, (N–1)th page, . . . , second page, and first page and, after completion of the feeding of the N originals which are fed by said original feeding means, the original image data is sequentially read out from the storage means in accordance with the ascending order of the first page, second page, . . . , (N–1)th page, and Nth page and is outputted to said transmitting means.

11. An image forming apparatus comprising:

first enclosing means for enclosing rectangular recording sheets in a first direction;

second enclosing means for enclosing rectangular reording sheets in a second direction which differs from said first direction by 90°, wherein a size of the recording sheets enclosed in said first enclosing means is the same as a size of the recording sheets enclosed in said second enclosing means;

generating means for generating a first group of image data and a second group of image data;

rotating means for 90° rotating the image data generated by said generating means; and image forming means for forming an image based on image data generated by said generating means onto the recording sheet enclosed in said first enclosing means or onto the recording sheet enclosed in said second enclosing means, wherein said image forming means automatically changes the recording sheet for image formation from the recording sheet enclosed in said first enclosing mean to the recording sheet enclosed in said second enclosing means in accordance with the change of an image forming operation based on the first group of image data to an image forming operation based on the second group of image data, and wherein said image forming means forms onto the recording sheet an image based on the first group of image data to which a rotation is not applied by said rotating means and forms onto the recording sheet an image based on the second group of image data to which the rotation processing is applied by said rotating means.

12. An image forming method in an image forming apparatus comprising first enclosing means for enclosing rectangular recording sheets in a first direction, and second enclosing means enclosing rectangular recording sheets in a second direction which differs from said first direction by 90°, said method comprising the step of:

generating a first group of image data and a second group of image data;

rotating the generated image data by 90°;

forming an image based on image data generated onto the recording sheet enclosed in said first enclosing means or onto the recording sheet enclosed in said second enclosing means, wherein a size of the recording sheets enclosed in said first enclosing means is the same size of the recording sheets enclosed in said second enclosing means; and automactically changing the recording sheet for image formation from the recording sheet enclosed in said first enclosing means to the recording sheet enclosed in said second enclosing means in accordance with the change of an image forming operation based on the first group of image data to an image forming operation based on the second group of image data, so that the image based on the second group of image data rotated is formed on he recording sheet enclosed in said second enclosing means, wherein an image based on the first group of image data to which rotation processing is not applied is formed onto the recording sheet enclosed in the first enclosing means.

13. An image forming method comprising the steps of:

inputting first image data from a first device and for inputting second image data from a second device in said first direction, respectively;

rotating the image data input from said input step in said second direction; and forming an image based on image data input from said input step onto a recording sheet enclosed in a first enclosing means which encloses rectangular sheets in a first direction or onto a recording sheet enclosed in a second enclosing means which encloses rectangular recording sheets in a second direction which differs from said first direction by 90°, wherein said image forming step automatically changes the recording sheet for image formation from the recording sheet enclosed in said first enclosing means to the recording sheet enclosed in said second enclosing means in accordance with the change of an image forming operation based on the first image data input from said first device to an image forming operation based on the second image data input from said second device, so that the image based on the second image data rotated by said rotating step is formed on the recording sheet enclosed in said second enclosing means.

14. A method according to claim 13, wherein the functions of said first device and said second device are different from each other.

15. A method according to claim 14, wherein each of said functions is either a copy function, a facsimile function, a file print function for printing an image preserved, or a printer function for printing an image from a computer.

16. An image forming method comprising the steps of:

inputting first image data from a first device and for inputting second image data from a second device; and forming an image based on image data input from said input step onto recording sheets enclosed in a first enclosing means which encloses sheets of a first type or a recording sheet enclosed in a second enclosing means which encloses sheets of a second type different from said first recording sheets, wherein said image forming step changes the recording sheet for image formation from the recording sheet enclosed in said first enclosing means to the recording sheet enclosed in said second enclosing means in accordance with the change of an image forming operation based on the first image data input from said first device to an image forming operation based on the second image data input from said second device, so that the image based on the second image data is formed on the recording sheet enclosed in said second enclosing step.

17. An apparatus according to claim 16, wherein the functions of said first device and said second device are different from each other.

18. A method according to claim 17, wherein each of said functions is either a copy function, a facsimile function, a file print function for printing an image preserved, or a printer function for printing an image from a computer.

19. An image forming method comprising the steps of:

inputting first image data from a first device and inputting second image data from a second device; and forming an image based on image data input from said input step onto recording sheets enclosed in a first enclosing means for enclosing recording sheets of a first type, wherein said image forming step automatically discharges a recording sheet enclosed in a second enclosing means, which encloses recording sheets of a second type different from said first type, when said first image data from the first device is changed to said second image data from the second device.

20. A method according to claim 19, wherein the functions of said first device and said second device are different from each other.

21. A method according to claim 20, wherein each of said functions is either a copy function, a facsimile function, a file print function for printing an image preserved, or a printer function for printing an image from a computer.

22. An image processing method comprising the steps of:

sequentially feeding N originals stacked sequentially in accordance with the order from the first page to the Nth page to an exposing position one sheet by one in accordance with the descending order of the Nth page, (N−1)th page, ... , second page, and first page;

reading an image of the original which is exposed at said exposing position;

storing image data of said N originals which are read by said reading means;

recording the image data read by said reading step onto a recording sheet and for discharging the recording sheet in a state in which a recording surface is upside up;

facsimile-transmitting the image data read by the reading step; and controlling in the manner such that the data read by the reading step is Sequentially outputted to said recording step and said storage step in accordance with the descending order of the Nth page, (N−1)th page, ... , second page and first page and, after completion of the feeding of the N originals which are fed by said original feeding step, the original image data is sequentially read out from the storage step in accordance with the ascending order of the first page, second page, ... , (N−1)th page, and Nth page and is outputted to said transmitting step.

23. An image forming method comprising the steps of:

inputting first, second and third image data;

synthesizing said first and third image data from said input step and for synthesizing the second and third image data; and forming an image onto a first recording medium based on the image data synthesized with said first and third image data by the synthesizing step, and for forming an image onto a second recording medium based on the image data synthesized with said second and third image data by the synthesizing step.

* * * * *

UNITED STATES PATENT AND TRADEMARK OFFICE
CERTIFICATE OF CORRECTION

PATENT NO. : 5,621,541

DATED : April 15, 1997

INVENTORS : Masanori Sakai, et al.

It is certified that error appears in the above-identified patent and that said Letters Patent is hereby corrected as shown below:

COLUMN 1

```
Line 33, "is" should read --has--; and
Line 66, "present" should read --present invention--.
```

COLUMN 2

```
Line 21, "ms" should read --is--; and
Line 29, "ms" should read --is--.
```

COLUMN 6

```
Line 19, "Control" should read --control--.
```

COLUMN 7

```
Line 22, "(FIG." should read --(FIG. 5)--.
```

COLUMN 10

```
Line 38, "mfacsimile" should read --facsimile--.
```

UNITED STATES PATENT AND TRADEMARK OFFICE
CERTIFICATE OF CORRECTION

PATENT NO. : 5,621,541

DATED : April 15, 1997

INVENTORS : Masanori Sakai, et al.

It is certified that error appears in the above-identified patent and that said Letters Patent is hereby corrected as shown below:

COLUMN 13

Line 6, "tile" should read --the--; and
Line 26, "form" should read --from--.

COLUMN 15

Line 49, "to to" should read --to--.

COLUMN 16

Line 23, "reord-" should read -- record- --;
Line 41, "mean" should read --means--; and
Line 49, "rotation" should read --rotation processing--;

COLUMN 17

Line 11, "he" should read --the--.

UNITED STATES PATENT AND TRADEMARK OFFICE
CERTIFICATE OF CORRECTION

PATENT NO. : 5,621,541

DATED : April 15, 1997

INVENTORS : Masanori Sakai, et al.

It is certified that error appears in the above-identified patent and that said Letters Patent is hereby corrected as shown below:

COLUMN 18

```
Line 1, "An apparatus" should read --A method--; and
Line 45, "Sequentially" should read --sequentially--.
```

Signed and Sealed this

Second Day of December, 1997

Attest:

BRUCE LEHMAN

Attesting Officer

Commissioner of Patents and Trademarks